(12) United States Patent
Xu et al.

(10) Patent No.: US 10,687,258 B2
(45) Date of Patent: Jun. 16, 2020

(54) ELECTRONIC DEVICE IN WIRELESS COMMUNICATION SYSTEM AND WIRELESS COMMUNICATION METHOD

(71) Applicant: Sony Corporation, Tokyo (JP)

(72) Inventors: Xiaodong Xu, Beijing (CN); Yi Zhang, Beijing (CN); Yunqiu Xiao, Beijing (CN); Ce Wang, Beijing (CN); Xi Ke, Beijing (CN); Bingshan Hu, Beijing (CN)

(73) Assignee: SONY CORPORATION, Tokyo (JP)

( * ) Notice: Subject to any disclaimer, the term of this patent is extended or adjusted under 35 U.S.C. 154(b) by 163 days.

(21) Appl. No.: 15/758,222

(22) PCT Filed: Sep. 19, 2016

(86) PCT No.: PCT/CN2016/099312
§ 371 (c)(1),
(2) Date: Mar. 7, 2018

(87) PCT Pub. No.: WO2017/050195
PCT Pub. Date: Mar. 30, 2017

(65) Prior Publication Data
US 2018/0255489 A1    Sep. 6, 2018

(30) Foreign Application Priority Data

Sep. 21, 2015    (CN) .......................... 2015 1 0604613

(51) Int. Cl.
*H04W 36/00* (2009.01)
*H04W 36/30* (2009.01)
(Continued)

(52) U.S. Cl.
CPC ....... *H04W 36/0083* (2013.01); *H04W 24/08* (2013.01); *H04W 36/00* (2013.01);
(Continued)

(58) Field of Classification Search
None
See application file for complete search history.

(56) References Cited

U.S. PATENT DOCUMENTS

2009/0137237 A1* 5/2009 Nakashima ............ H04B 7/022
                                                     455/422.1
2012/0201164 A1    8/2012 Joengren et al.
(Continued)

FOREIGN PATENT DOCUMENTS

CN    101483893 A    7/2009
CN    101742601 A    6/2010
(Continued)

OTHER PUBLICATIONS

International Search Report dated Nov. 29, 2016, in PCT/CN2016/099312 filed Sep. 19, 2016.
(Continued)

*Primary Examiner* — Ayanah S George
(74) *Attorney, Agent, or Firm* — Xsensus LLP

(57) ABSTRACT

An electronic device in a wireless communication system and a wireless communication method, including plural cells including current cells and at least one neighbouring cell. The electronic device includes: a transceiver; a first trigger circuit configured to enable the transceiver to conduct a first measurement report, to assist in starting a relay process for enabling the electronic device to communicate with a current cell via a relay user equipment; a second trigger circuit configured to enable the transceiver to conduct a second measurement report, to assist in starting a handover process for enabling the electronic device to be switched from the current cell to the neighbouring cell; and one or more processing circuits configured to control the first and second trigger circuits, to enable the transceiver to conduct the first measurement report before conducting the second measurement report.

20 Claims, 11 Drawing Sheets

(51) Int. Cl.
*H04W 24/08* (2009.01)
*H04W 88/04* (2009.01)
*H04W 24/10* (2009.01)
*H04W 92/08* (2009.01)

(52) U.S. Cl.
CPC ............ *H04W 36/30* (2013.01); *H04W 88/04* (2013.01); *H04W 24/10* (2013.01); *H04W 92/08* (2013.01); *Y02D 70/122* (2018.01); *Y02D 70/126* (2018.01); *Y02D 70/1262* (2018.01); *Y02D 70/1264* (2018.01); *Y02D 70/142* (2018.01); *Y02D 70/164* (2018.01); *Y02D 70/166* (2018.01); *Y02D 70/21* (2018.01); *Y02D 70/39* (2018.01)

(56) References Cited

U.S. PATENT DOCUMENTS

| | | | |
|---|---|---|---|
| 2014/0378142 A1* | 12/2014 | Xuan | H04W 36/0088 455/437 |
| 2016/0112998 A1 | 4/2016 | Joengren et al. | |
| 2016/0353307 A1* | 12/2016 | Jung | H04W 24/10 |

FOREIGN PATENT DOCUMENTS

| | | |
|---|---|---|
| CN | 102111806 A | 6/2011 |
| WO | 2014/198317 A1 | 12/2014 |

OTHER PUBLICATIONS

Extended Search Report issued in European Application 16848076.2 dated Aug. 8, 2018.
NEC, "Prose Relay Discovery Assisted by E-UTRAN", 3GPP Draft; S2-133376 Prose Relay V0-2, 3rd Generation Partnership Project (3GPP), SA WG2 Meeting #99, 4 Pages total, (Sep. 23-27, 2013).
ZTE, "Out of Coverage Detection and Service Continuity", 3GPP Draft; R2-141486—Out of Coverage Detection and Service Continuity, 3rd Generation Partnership Project (3GPP), 3GPP TSG-RAN WG2 Meeting #85bis, 5 Pages total, (Mar. 31-Apr. 4, 2014).
Sony, "Relay Measurements and Selection/Reselection", 3GPP Draft; R2-153128 D2D Relay Measurements, 3rd Generation Partnership Project (3GPP), 3GPP TSG RAN WG2 Meeting #91, 4 Pages total, (Aug. 24-28, 2015).
Chen, Y., et al., "Analysis and Improvement of Mobility Procedures for Mobile Relays in LTE Networks", 2015 IEEE 26th Annual International Symposium on Personal, Indoor, and Mobile Radio Communications (PIMRC): Mobile and Wireless Networks, pp. 1769-1774, (Aug. 30, 2015).
Sony, "Transparent Relay Mobility (alt.2)", 3GPP Draft; R2-152437 Transparent Relay Mobility, 3rd Generation Partnership Project (3GPP), 3GPP TSG RAN WG2 Meeting #90, 3 Pages total, (May 25-29, 2015).
Sony, "UE-to-Network Relay Measurements and Selection/Reselection", 3GPP Draft; R2-151080 D2D Relay Measurements, 3rd Generation Partnership Project (3GPP), 3GPP TSG RAN WG2 Meeting #89bis, 3 Pages total, (Apr. 20-24, 2015).
Sony, "Mobility Using Uplink Measurements", 3GPP Draft; R2-166743 NR Mobility, 3rd Generation Partnership Project (3GPP), 3GPP TSG RAN WG2 Meeting #9Sbis, 4 Pages total, (Oct. 10-14, 2016).

* cited by examiner

ELECTRONIC DEVICE IN WIRELESS COMMUNICATION SYSTEM AND WIRELESS COMMUNICATION METHOD

CROSS-REFERENCE TO RELATED APPLICATIONS

The present application is a National Stage application of PCT international patent application PCT/CN2016/099312, filed on Sep. 19, 2016, which claims the priority to Chinese Patent Application No. 201510604613.0, titled "ELECTRONIC DEVICE IN WIRELESS COMMUNICATION SYSTEM AND WIRELESS COMMUNICATION METHOD", filed with the Chinese State Intellectual Property Office on Sep. 21, 2015, and the entire disclosures of each of which are incorporated herein by reference.

FIELD

The present disclosure relates to the technical field of wireless communication, and in particular to an electronic device in a wireless communication system and a method for performing wireless communication in a wireless communication system.

BACKGROUND

This section provides background information relating to the present disclosure, which is not necessarily prior art.

When a User Equipment (UE) moves from a service cell to a neighbor cell, the UE will start a handover process. When performing the handover, the UE disconnects a Radio Resource Control (RRC) connection with a source cell, and establishes an RRC connection with a target cell.

In the traditional handover process, the following problems may exist for example. Firstly, when the UE moves and traverses a cell with a high speed, a Signal to Interference plus Noise Ratio (SINR) at an edge of the cell will decreases quickly, resulting in a low link quality even a link failure, and frequency cell handover will cause a great signaling overhead. Secondly, in a case of actual cell deployment, a boundary of the cell is not ideal hexagon, the SINR may fluctuate greatly when the UE performs the handover, therefore it is difficult to select a target cell when performing the handover, and the handover process is to be configured reasonably to avoid a ping-pang effect. Thirdly, when the UE moves from inside to outside of a coverage, communication between a remote UE and an evolved Node B (eNodeB) is handed over from the previous RRC connection to switching of a relay UE via a PC5 interface, resulting in a service interruption during this process.

Therefore, for at least one of the above problems, it is necessary to provide a new wireless communication technical solution, to solve a problem of quality of service of the UE at the edge of the cell, thereby improving continuity and effectiveness of the handover, performing the handover effectively, and reducing a signaling burden for the network.

SUMMARY

This section provides a general summary of the present disclosure, and is not a comprehensive disclosure of its full scope or all of its features.

An object of the present disclosure is provide an electronic device in a wireless communication system and a method for performing wireless communication in a wireless communication system thereby improving continuity and effectiveness of the handover, performing the handover effectively and reducing a signaling burden for a network.

According to an aspect of the present disclosure, an electronic device in a wireless communication system is provided, where the wireless communication system includes multiple cells including a current cell in which the electronic device is located and at least one neighbor cell, and the electronic device includes: a transceiver; a first trigger circuit configured to cause the transceiver to perform a first measurement report, so as to facilitate starting of a relay process for causing the electronic device to communicate with the current cell via a relay user equipment; a second trigger circuit configured to cause the transceiver to perform a second measurement report, so as to facilitate starting of a handover process for causing the electronic device to hand over from the current cell to the neighbor cell; and one or more processing circuits configured to control the first and second trigger circuits, so as to cause the transceiver to perform the first measurement report prior to the second measurement report.

According to another aspect of the present disclosure, an electronic device in a wireless communication system is provided, where the wireless communication system includes multiple cells including a current cell in which the electronic device is located and at least one neighbor cell, and the electronic device includes: one or more processing circuits configured to perform operations of: acquiring a first measurement report from a user equipment of the current cell; starting a relay process for causing the user equipment to communicate with the current cell via a relay user equipment; acquiring, after the first measurement report is acquired, a second measurement report from the user equipment; and starting a handover process for causing the user equipment to hand over from the current cell to the neighbor cell.

According to another aspect of the present disclosure, an electronic device in a wireless communication system is provided, where the wireless communication system includes multiple cells including a current cell in which the electronic device is located and at least one neighbor cell, and the electronic device includes: a transceiver; and one or more processing circuits configured to perform operations of determining relay configuration information on a user equipment in the current cell; and causing, based on the relay configuration information, the transceiver to perform relay communication between the user equipment and the current cell before the user equipment hands over from the current cell to the neighbor cell.

According to another aspect of the present disclosure, a wireless communication system including a current cell and at least one neighbor cell is provided, which includes: a user equipment, where the user equipment includes: a first transceiver, a first trigger circuit configured to cause the first transceiver to perform a first measurement report, so as to facilitate starting of a relay process for causing the user equipment to communicate with the current cell via a relay user equipment, a second trigger circuit configured to cause the first transceiver to perform a second measurement report, so as to facilitate starting of a handover process for causing the user equipment to hand over from the current cell to the neighbor cell, and one or more first processing circuits configured to control the first and second trigger circuits, so as to cause the first transceiver to perform the first measurement report prior to the second measurement report; a base station, where the base station includes: one or more second processing circuits configured to perform operations of acquiring the first measurement report; starting the relay process, acquiring, after the first measurement report is acquired, the second measurement report, and starting the handover process; and a relay user equipment, where the relay user equipment includes: a second transceiver, and one or more third processing circuits configured to perform operations of: determining relay configuration information on the user equipment, and causing, based on the relay configuration information, the second transceiver to perform relay communication between the user equipment and the current cell before the user equipment hands over from the current cell to the neighbor cell.

According to another aspect of the present disclosure, a method for performing wireless communication in a wireless communication system is provided, where the wireless communication system includes multiple cells including a current cell and a neighbor cell, and the method includes: performing a first measurement report, so as to facilitate starting of a relay process for causing an electronic device to communicate with the current cell via a relay user equipment; and performing, after the first measurement report is performed, a second measurement report, so as to facilitate starting of a handover process for causing the electronic device to hand over from the current cell to the neighbor cell.

According to another aspect of the present disclosure, a method for performing wireless communication in a wireless communication system is provided, where the wireless communication system includes multiple cells including a current cell and a neighbor cell, and the method includes: acquiring a first measurement report from a user equipment of the current cell; starting a relay process for causing the user equipment to communicate with the current cell via a relay user equipment; acquiring, after the first measurement report is acquired, a second measurement report from the user equipment; and starting a handover process for causing the user equipment to hand over from the current cell to the neighbor cell.

According to another aspect of the present disclosure, a method for performing wireless communication in a wireless communication system is provided, where the wireless communication system includes multiple cells including a current cell and a neighbor cell, and the method includes: determining relay configuration information on a user equipment in the current cell; and performing, based on the relay configuration information, relay communication between the user equipment and the current cell before the user equipment hands over from the current cell to the neighbor cell.

With the electronic device in the wireless communication system and the method for performing wireless communication in the wireless communication system according to the present disclosure, a relay process can be performed before the handover process is performed, thereby improving continuity and effectiveness of the handover, performing the handover effectively and reducing a signaling burden for a network.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1A:
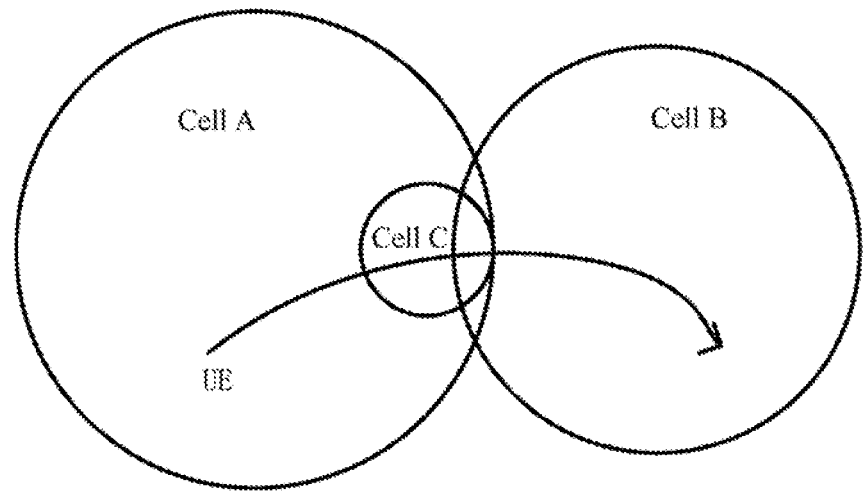
FIG. 1(a) is a schematic diagram showing a scene that a UE traverses a small cell quickly.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings. The following description is merely exemplary in nature and is not intended to limit the present disclosure, application, or uses.

Example embodiments are provided such that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A User Equipment (UE) involved in the present disclosure includes but not limited to terminals with a wireless communication function such as a mobile terminal, a computer, and an on-board device. Further, depending on the described functions, the UE involved in the present disclosure may be the UE itself or components in the UE such as a chip. In addition, similarly, the base station involved in the present disclosure may be an evolution Node Base station (eNB) or components in the eNB such as a chip, for example.

FIG. 1(a) shows a scene that a high-speed UE traverses a small cell. As shown in FIG. 1, the UE moves with high speed from a cell A towards a cell B via a cell C. With increase of a deployment density of small cells, the high-speed UE will trigger frequent handover in order to maintain continuity of service. However, a coverage of the small cell is limited, and a Signal to Interference plus Noise Ratio (SINR) of the small cell is reduced severely in a case of handing over from the small cell to a macro cell, thereby generally resulting in a wireless link failure. In addition, frequent handover generates a great signaling overhead for a network and network congestion occurs to a certain degree, therefore it is a difficult problem to hand over by the high-speed UE in the small cell network.

In addition, for a cellular network, it is assumed that a coverage of the cell is an ideal regular hexagon. Because in a case that an area of a service region is certain, an overlapping area is minimum for cellular regular hexagon, and the cellular regular hexagon is closest to the ideal antenna coverage. Therefore, in an ideal case, each cell has a fixed regular hexagon cell boundary, and has a fixed target cell for handover. However, in an actual case, the boundary of the cell is blur generally, and there are generally multiple target cells for handover, particularly for a region where there is no primary coverage cell. In addition, during a handover process, the SINR may fluctuate greatly. In this case, a great hysteresis parameter is to be configured, otherwise it is easy to generate a ping-pang effect. However, with increase of the hysteresis parameter, an SINR of an edge of a service cell becomes lower when handing over and a probability of a handover failure becomes higher. Therefore, in the actual network deployment, it needs to select and trade-off between the above two aspects.

Figure 1B:
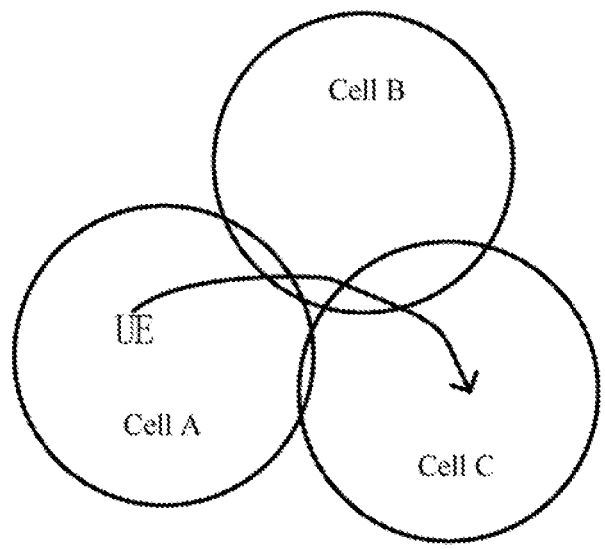
FIG. 1(b) is a schematic diagram showing a scene that a UE traverses an edge of a cell.

For example, a motion trajectory of the UE and distribution of the cell coverage are shown in FIG. 1(b). FIG. 1(b) shows a scene that the UE traverses an edge of the cell. The UE moves to a cell C from a cell A via a cell B. However, from a view of a manner for the UE to traverse the cell, the UE stays in the cell B for a short time period, and a stay event for the short time period or a ping-pang handover event may occur easily. If the UE does not traverse the cell B during the moving process, the SINR reduces quickly when the UE moves to an edge of the cell A, and a wireless link failure occurs. It needs to trade-off between the handover failure and the ping-pang effect.

Figure 2:
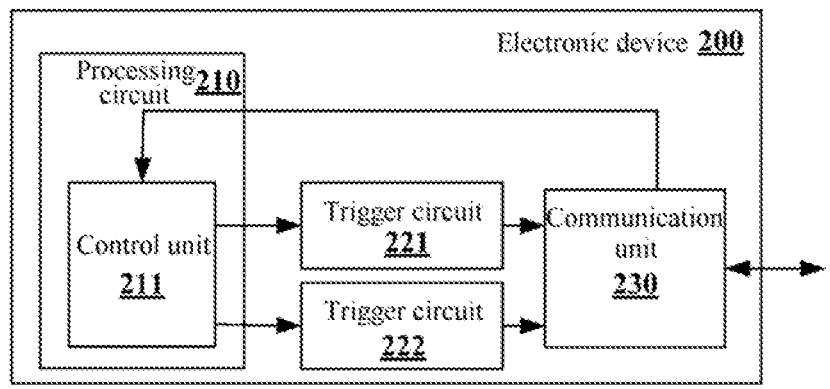
FIG. 2 is a block diagram of a structure of an electronic device in a wireless communication system according to an embodiment of the present disclosure.

For at least one of the above problems, technical solutions of the present disclosure are proposed. FIG. 2 shows a structure of an electronic device 200 in a wireless communication system according to an embodiment of the present disclosure.

As shown in FIG. 2, the electronic device 200 may include a processing circuit 210 and trigger circuits 221 and 222. It should be noted that, the electronic device 200 may include one processing circuit 210 or multiple processing circuits 210. In addition, the electronic device 200 may further include a communication unit 230 as a transceiver and so on.

Furthermore, the processing circuit 210 may include separate functional units to perform different functions and/or operations. It should be noted that, the functional units may be physical entities or logical entities, and units with different names may be implemented by a same physical entity.

For example, as shown in FIG. 2, the processing circuit 210 may include a control unit 211.

The wireless communication system according to the embodiment of the present disclosure may include multiple cells. The multiple cells may include a current cell where the electronic device 200 is located and at least one neighbor cell.

In the electronic device 200 shown in FIG. 2, the trigger circuit 221 may cause the communication unit 230 to perform a first measurement report, to facilitate starting of a relay process for causing the electronic device 200 to communicate with the current cell via a relay UE.

In addition, the trigger circuit 222 may cause the communication unit 230 to perform a second measurement report, to facilitate starting of a handover process for causing the electronic device 200 to hand over from the current cell to the neighbor cell.

Here, the control unit 211 may control the trigger circuits 221 and 222, such that the communication unit 230 performs the first measurement report prior to the second measurement report.

With the electronic device 200 according to the embodiment of the present disclosure, the electronic device 200 can communicate with the cumin cell via the relay UE before the electronic device 200 hands over from the current cell to the neighbor cell. In this way, continuity and effectiveness for the handover can be improved, the handover is performed effectively, and the signaling burden for the network is reduced.

For example, in the scene shown by FIG. 1(a), when the UE moves to an edge of the cell A, a relay process from the UE to a network may be triggered by using a UE in the cell A as a repeater. A coverage of the small cell C is small, therefore communication with the Cell A may be transferred by the repeater all the time in the coverage of the small cell C, and then it is handed over from the cell A to the cell B. Since it is connected to the relay UE all the time, thereby avoiding a handover failure; and the process of handing over to the cell C by the UE is omitted, thereby reducing the signaling burden for the network.

In addition, in the scene shown by FIG. 1(b), when the UE moves to the edge of the cell A, a relay process from the UE to the network may be triggered and communication is performed with a base station A via the relay UE, instead of handing over to the cell B. When the UE moves to an edge of the cell C, it is handed over to the cell C. In this way, neither the wireless link failure occurs, nor the ping-pang effect or the stay event for the short time period occurs, thereby reducing an interrupt rate and saving the unnecessary signaling overhead.

Handover in a Long Term Evolution (LTE) system and an LTE-Advanced system is to hard handover, and service interrupt for a certain duration may occur during the handover process. If a handover failure event occurs, the UE recovers a wireless link and performs a Radio Resource Control (RRC) reconstruction process. During the process, the service interrupt duration is much longer than a duration for successful handover. Therefore, during a moving process of the UE, it needs to avoid the handover failure event from occurring as much as possible. The ping-pang handover increases the total number of handover and thus increases the service interrupt duration, therefore it also needs to avoid the ping-pang handover from occurring as much as possible.

In order to enhance an edge coverage of the network and improve a quality of service of an edge UE, a repeater as a low power node is deployed at an edge of the network in the LTE system and the LTE-Advanced system, thereby shortening a distance from the UE and improving a link quality. Relay means that a base station or a UE does not transmit a signal directly to each other, and a signal is forwarded by a relay node by signal amplification or signal regeneration. According to mobility of the repeater, the repeater may be classified into a fixed repeater, a nomadic repeater and a mobile repeater. The fixed repeater is deployed in network planning, and does not move in a long time period. The nomadic repeater is a repeater deployed urgently in response to an emergency event. When the emergency event ends, the nomadic repeater is removed. The mobile repeater is deployed on a vehicle and moves together with its served UE.

The traditional repeater is deployed fixedly or moves together with the vehicle. If the UE functions as a repeater to facilitate the handover process, there are the following advantages. Firstly, a transmitting power of the relay UE follows a standard for Device to Device (D2D), the power is smaller and interference is lower. Secondly, the relay UE may move freely, the number of the relay UEs is greater, therefore a distance between the relay UE and a UE is further shortened and a link quality is better. Therefore, in the technical solution according to the present disclosure, the relay process is used to facilitate the handover process, thereby obtaining better service continuity.

The traditional handover process is based on an A3 event. When a reception power of the neighbor cell is greater than a sum of a reception power of a service cell and an offset value, the A3 event is triggered. If the A3 event is always satisfied within a time period of Time To Trigger (TTT), a measurement report is triggered. Next, the handover process is started, an RRC connection with a source cell is disconnected and an RRC connection with a target cell is established.

In order to understand the technical solutions of the present disclosure better, the A3 event is described simply hereinafter.

An entering condition for the A3 event is:

Mn+Ofn+Ocn−Hys>Ms+Ofs+Ocs+Off.

A leaving condition for the A3 event is:

Mn+Ofn+Ocn+Hys<Ms+Ofs+Ocs+Off.

In which,

Mn indicates a measurement result of the neighbor cell without considering any offset.

Ofn indicates an offset specific to a frequency of the neighbor cell (that is offsetFreq, which is defined as a frequency corresponding to the neighbor cell in measObjectEUTRA).

Ocn indicates a cell individual offset of the neighbor cell (that is, cellIndividualOffset, which is defined as a frequency corresponding to the neighbor cell in measObjectEUTRA), and is set as zero if the neighbor cell is not configured.

Ms indicates a measurement result of the service cell without calculating any offset.

Ofs indicates an offset specific to a frequency for a service frequency (that is offset which is defined as a frequency corresponding, to a service in measObjectEUTRA).

Ocs indicates a cell individual offset of the service cell (that is cellIndividualOffset, which is defined as a frequency corresponding to a service measObjectEUTRA), and is set as zero if the service cell is not configured.

Hys indicates a hysteresis parameter for an event (that is hysteres, which is a parameter defined for the event in reportConfigEUTRA).

Off indicates an offset parameter for the event (that is, a3-Offset, which is a parameter defined for the event in reportConfigEUTRA).

When a Reference Signal Receiving Power (RSRP) of the neighbor cell satisfies the entering condition for the A3 event, TTT timing is triggered. The leaving condition for the A3 event is not satisfied in the TTT time, a measurement report for the A3 event is triggered.

Information Element (IE) TimeToTrigger is defined as follows in standardization.

```
--ASN1START
TimeToTrigger ::=    ENUMERATED{
                     ms0, ms40, ms64, ms80, ms100, ms128,
                     ms160, ms256, ms320, ms480, ms512, ms640,
                     ms1024, ms1280, ms2560, ms5120}
--ASN1STOP
```

IE TimeToTrigger specifies a range of values of a trigger time parameter. The trigger time parameter relates to the following time period: during which, a specified standard for the event is to be satisfied to trigger a measurement report. The value ms0 corresponds to 0 ms, ms40 corresponds to 40 ms, and so on.

IE Hysteresis is defined as follows in the standardization:

```
--ASN1START
Hysteresis ::=              INTEGER  (0..30)
--ASN1STOP
```

IE Hysteresis is a parameter used for the entering condition and the leaving condition for the event trigger report. An actual value is IE value*0.5 dB.

IE ReportConfigEUTRA is defined as follows in the standardization:

```
--ASN1START
ReportConfigEUTRA ::=    SEQUENCE{
   triggerType              CHOICE{
      event                 SEQUENCE{
         eventId            CHOICE{
            eventA1         SEQUENCE{
               a1-Threshold    ThresholdEUTRA
         },
         eventA2,           SEQUENCE{
               a2-Threshold    ThresholdEUTRA
         },
         eventA3            SEQUENCE{
            a3-Offset          INTEGER{-30..30},
            reportOnLeave      BOOLEAN
```

In which, a3-offset is an offset value used in the EUTRA measurement report trigger condition for the A3 event. An actual value is IE value*0.5 dB.

According to the embodiment of the present disclosure, the second measurement report mentioned above may be a measurement report for the A3 event. When it is determined that the entering condition for the A3 event is satisfied, the trigger circuit 222 starts timing. When it is determined that the leaving condition for the A3 event is satisfied, the trigger circuit 222 is reset. When a result of the timing of the trigger circuit 222 is equal to the trigger time TTT_A3, the communications unit 230 may perform the second measurement report to facilitate starting of the handover process.

In another aspect, according to the embodiment of the present disclosure, the first measurement report mentioned above may be a measurement report for a relay event. The processing circuit 210 (such as the control unit 211) may configure the relay event. When it is determined that the entering condition for the relay event is satisfied, the trigger circuit 221 starts timing. When it is determined that the leaving condition for the relay event is satisfied, the trigger circuit 221 is reset. When a result of the timing of the trigger circuit 221 reaches the trigger time TTT_R, the communication unit 230 may perform the first measurement report to facilitate starting of the relay process.

Here, the processing circuit 210 (such as the control unit 211) may configure the entering condition for the relay event, such that the trigger circuit 221 starts timing prior to the trigger circuit 222. Further, the processing circuit 210 (such as the control unit 211) may configure the leaving condition for the relay event, such that the trigger circuit 221 is reset posterior to the trigger circuit 222.

For example, a new "R event" may be defined as a relay event. An entering condition for the R event is:

Mn+Ofn+Ocn−Hys_out<Mp+Ofp+Ocp+Off.

A leaving condition for the R event is:

Mn+Ofn+Ocn+Hys_out<Mp+Ofp+Ocp+Off.

In which,

Mp and Mn indicate a measurement result of a current cell and a measurement result of a neighbor cell respectively;

Ofp and Ofn indicate proprietary frequency compensations of the current cell and the neighbor cell respectively;

Ocp and Ocn indicate cell proprietary compensations of the current cell and a neighbor cell;

off indicates a compensation parameter for the event, which has a value equal to the offset vale for the A3 event.

Hys_in indicates a hysteresis parameter of the entering condition for the R event; and Hys_out indicates a hysteresis parameter of the leaving condition for the R event.

The UE measures the neighbor cell periodically. When the RSRP of the neighbor cell is greater than a sum of the RSRP of the service cell and the offset, the R event is triggered. If the leaving condition for the R event is not satisfied in one TTT_R, a measurement report for the R event is triggered (report content is the same as report content of the A3 event, including RSRPs, Reference Signal Receiving Qualities (RSRQs) and cell IDs and so on of a service cell and a neighbor cell), and a source base station determines whether to perform a relay communication process between the UE and a network.

According to the embodiment of the present disclosure, the processing circuit 210 (such as the control unit 211) controls the trigger circuits 221 and 222 based on the RSRPs received from the current cell and the neighbor cell by the communication unit 230.

The processing circuit 210 (such as the control unit 211) may, for example, configure the Hys_in and Hys_out, such that the entering condition for the R event is satisfied prior to the entering condition for the A3 event, and the leaving condition for the R event is satisfied posterior to the leaving condition for the A3 event. In other words, the processing circuit 210 (such as the control unit 211) may configure the Hys_in and Hys_out such that the trigger circuit 221 starts timing prior to the trigger circuit 222, and the trigger circuit 221 is reset posterior to the trigger circuit 222.

According to a preferred embodiment of the present disclosure, the processing circuit 210 (such as the control unit 211) may configure a relay event (such as the R event), and scales related parameters (such as Hys) on a hysteresis effect of the A3 event by using scaling parameters, to set related parameters (such as Hys_in and Hys_out) on a hysteresis effect of the relay event, such that the communication unit 230 performs a first measurement report prior to the second measurement report. Here, the processing circuit 210 (such as the control unit 211) may determine, the scaling parameter based on indication information from a base station.

Specifically, the processing circuit 210 (such as the control unit 211) may configure the relay event (such as the R event), such that the hysteresis parameter in the entering condition for the relay event (i.e., Hys_in) is x times of the hysteresis parameter in the entering condition for the A3 event (i.e., Hys), and the hysteresis parameter in the leaving condition for the relay event (i.e., Hys_out) is 1+x times of the hysteresis parameter in the leaving condition for the A3 event (i.e., Hys). In which, x is a real number within a range 0 to 1.

In other words, the processing circuit 210 (such as the control unit 211) may configure the R event to meet the following formulas:

$$Hys\_in = x * Hys\_A3$$

$$Hys\_out = (1+x) * Hys\_A3$$

In which, Hys_A3 indicates the hysteresis parameter for the A3 event.

Further, the processing circuit 210 (such as the control unit 211) may further configure the relay event (such as the R event), such that TTT_R=x*TTT_A3. In which, x is a real number within a range of 0 to 1.

Here, Hys_in, Hys_out and TTT_R each indicate the hysteresis effect of the R event, which may use the same scaling parameter x.

It may be seen from the above description that, with gradually decrease of the RSRP of the service cell, the RSRP of the neighbor cell gradually increases, and the entering conditions and the leaving conditions for the R event and the A3 event are satisfied in the follower time order.

The entering condition for the R event is satisfied, the entering condition for the A3 event is satisfied, the leaving condition for the A3 event is satisfied, and the leaving condition for the R event is satisfied.

It follows that, the R event enters earlier and leavers later, while the A3 event enters later and leaves earlier.

Figure 3:
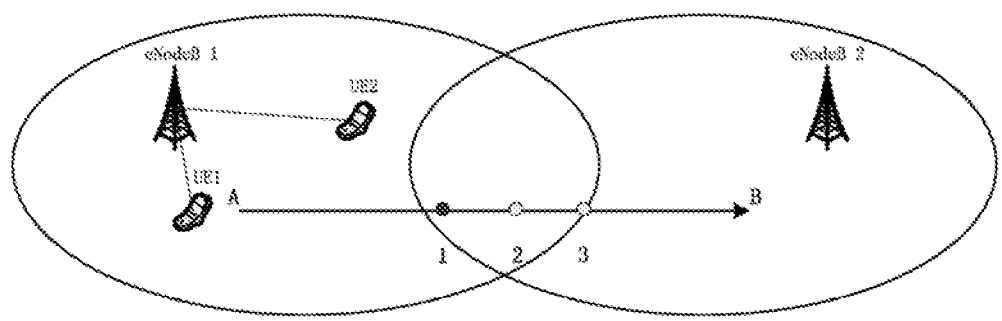
FIG. 3 is a schematic diagram of a handover process according to an embodiment of the present disclosure.

FIG. 3 shows a handover process according to an embodiment of the present disclosure. As shown in FIG. 3, UE1 it from A to B. When the UE1 moves to a point 2, the entering condition for the A3 event is satisfied. When the UE1 moves to a point 3, a handover process is initiated after time TTT. In the technical solution according to the present disclosure, when the UE1 moves to a point 1 (indicating that the UE1 moves to an edge region of the cell 1), a relay process front the UE to the network is triggered. For example, communication is performed with a base station 1 via UE2. When the UE1 reaches the point 2, the entering condition for the A3 event is satisfied, handover from the cell 1 to the cell 2 is triggered after one configurable TTT, so as to reduce an interrupt probability and improve service continuity.

According to a preferred embodiment of the present disclosure, when the neighbor cell which satisfies the entering condition for the relay event (such as the R event) is determined to be the same as the neighbor cell which satisfies the entering condition for the A3 event, the processing circuit 210 (such as the control unit 211) may adjust TTT_A3 to be 1−x times. In which, x is a real number with a range of 0 to 1.

If the R event is triggered before the entering condition for the A3 event is satisfied, Enhanced TTT_A3 can be dynamically configured according to whether the neighbor cell satisfying the trigger condition for the R event is the same as the neighbor cell satisfying the entering condition for the A3 event, to reduce a handover failure probability and a ping-pang handover probability.

When the neighbor cell satisfying the trigger condition for the R event is the same as the neighbor cell satisfying the entering condition for the A3 event, it may be configured such that Enhanced TTT_A3=(1−x)*TTT_A3, to reduce a handover failure probability.

When the neighbor cell satisfying the trigger condition for the R event is different from the neighbor cell satisfying the entering condition for the A3 event, it may be configured such that Enhanced TTT_A3=TTT_A3, to reduce a ping-pang handover probability.

A measurement report for the R event is not triggered in a case that the entering condition for the A3 event is satisfied, because the UE may move at a high speed and the RSRP of the source cell reduces rapidly, or the TTT_R is set as a great value. For any of the above cases, it cannot be determined whether the UE really moves towards the target cell, therefore a may be configured such that Enhanced TTT_A3=TTT_A3.

Here, TTT_A3 indicates TTT_A3 adjusted by using speedstatescalefactor.

According to the embodiment of the present disclosure, based on information indicating the relay UE received by the communication unit 230, the processing circuit 210 (such as the control unit 211) may control such that the electronic device 200 is connected to the relay UE via proximity-based service, so as to communicate with the current cell via the relay UE before handing over from the current service cell to the neighbor cell.

In another aspect, in a case that the relay communication from the UE to the network is triggered and the UE returns to the service cell due to some reasons during the moving process of the UE terminal, it needs to hand over from communication with the relay UE to direct communication with the base station.

In this case, according to the embodiment of the present disclosure, the electronic device 200 as shown in FIG. 2 may further include a third trigger circuit (not shown) configured to cause the communication unit 230 to perform a third measurement report, so as to facilitate starting of a "de-relay" process for causing the electronic device 200 to return to directly communicate with the current cell.

Here, the third measurement report may be a measurement report on a de-relay event. The processing circuit 210 (such as the control unit 211) may configure the de-relay event, such that the third trigger circuit starts timing when it is determined that an entering condition for the de-relay event is satisfied; the third trigger circuit is reset when it is determined that the leaving condition for the de-relay event is satisfied; and the communication unit 230 is caused to perform the third measurement report to facilitate starting of the de-relay process in a case that a result of the timing of the third trigger circuit reaches trigger time TTT_~R.

The processing circuit 210 (such as the control unit 211) may configure the entering condition for the de-relay event, such that the entering condition for the de-relay event is the same as the leaving condition for the relay event.

Further, the processing circuit 210 (such as the control unit 211) may further configure the leaving condition for the de-relay event, such that the leaving condition for the de-relay event is the same as the entering condition for the relay event.

Further, the processing circuit 210 (such as the control unit 211) may further configure the de-relay event, such that TTT_~R=TTT_R is reached.

Specifically, for example, a new "~R event" may be defined as the de-relay event. An entering condition for the ~R event is:

$$Mn+Ofn+Ocn+Hys\_out<Mp+Ofp+Ocp+Off.$$

A leaving condition for the ~R event is:

$$Mn+Ofn+Ocn-Hys\_in>Mp+Ofp+Ocp+Off.$$

In which, meanings of symbols are the same as those of the symbols in the R event. In addition, Hys_out and Hys_in have the same values as those in the R event, and TTT_~R=TTT_R.

It may be seen from above that, the entering condition and the leaving condition for the R event are just opposite to the entering condition and the leaving condition for the ~R event. That is, if the receiving power of the service cell is greater than a sum of the receiving power of the neighbor cell and the hysteresis value, the ~R event is triggered. If the leaving condition for the ~R event is not satisfied within the trigger time TTT_~R for the ~R event, a trigger report for the ~R event is triggered and the base station determines whether to hand over from communication via the relay to direct communication with the base station.

Figure 4:
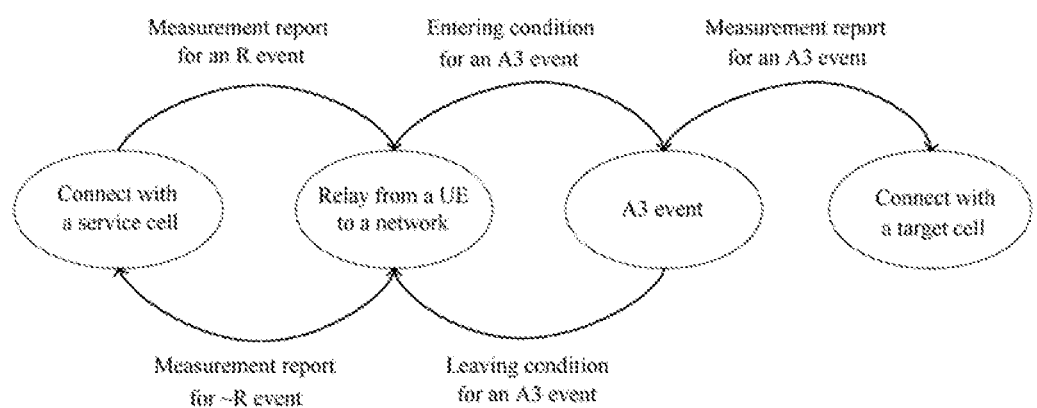
FIG. 4 is a diagram showing state transfer of a handover process according to an embodiment of the present disclosure.

FIG. 4 shows a diagram of state transfer of a handover process according to an embodiment of the present disclosure. Transfer of different states of the handover process may be seen clearly from FIG. 4.

It should be noted that, according to the embodiment of the present disclosure, the wireless communication system described above may be a Long Term Evolution-Advanced (LTE-A) cellular communication system, and the electronic device 200 may be a UE in the wireless communication system.

An electronic device 500 in a wireless communication system according to another embodiment of the present disclosure is described in conjunction with FIG. 5 subsequently. It should be noted that, unless otherwise specified, terms used in the following such as the first measurement report, the second measurement report and the relay event, may have the same meaning as corresponding terms mentioned above.

Figure 5:
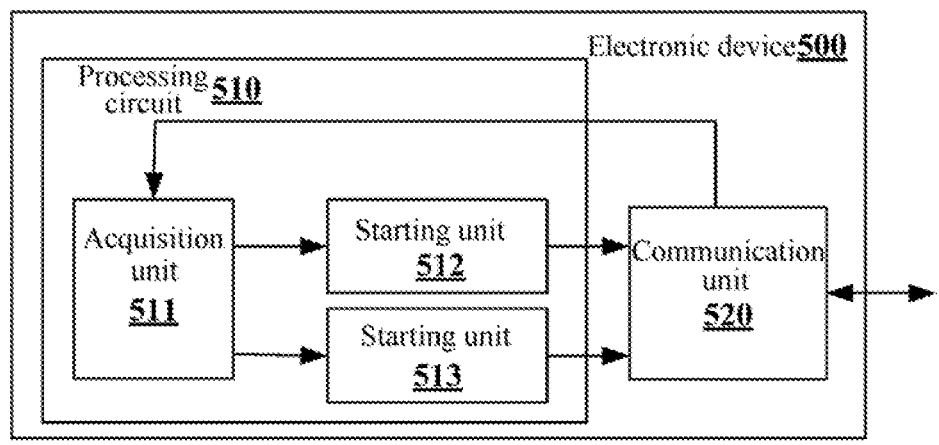
FIG. 5 is a block diagram of a structure of an electronic device in a wireless communication system according to another embodiment of the present disclosure.

FIG. 5 shows a structure of an electronic device 500 in a wireless communication system according to another embodiment of the present disclosure. Similarly, the wireless communication system includes multiple cells, and the multiple cells include a current cell in which the electronic device 500 is located and at least one neighbor cell.

As shown in FIG. 5, the electronic device 500 may include a processing circuit 510. It should be noted that, the electronic device 500 may include one processing circuit 510 or multiple processing circuits 510. In addition, the electronic device 500 may further include a communication unit 520 such as a transceiver.

As mentioned above, similarly, the processing circuit 510 may also include separate functional units to perform different functions and/or operations. The functional units may be physical entities or logical entities, and units with different names may be implemented by the same physical entity.

For example, as shown in FIG. 5, the processing circuit 510 may include an acquisition unit 511 and staying units 512 and 513.

The acquisition unit 511 may acquire a first measurement report from a UE of a current cell.

Based on the first measurement report acquired by the acquisition unit 511, the starting unit 512 may start a relay process for causing the UE to communicate with a current cell via a relay UE.

Subsequently; after the first measurement report is acquired, the acquisition unit 511 may further acquire a second measurement report from the UE.

Based on the second measurement report acquired by the acquisition unit 511, the starting unit 513 may start a handover process for causing the UE to hand over from the current cell to a neighbor cell.

Preferably, the processing circuit 510 (such as the acquisition unit 511) may further acquire region information on each UE in the current cell. Based on the region information, the processing circuit 510 (such as a determination unit, not shown) may determine at least one candidate relay UE. After this, the processing circuit 510 (such as a selection unit, not shown) may select one of the candidate relay UEs as a relay UE.

More preferably, the processing circuit 510 (such as the acquisition unit 511) may further acquire at least one of mobility state information, battery level information, load level information and quality of service information on each of the candidate relay UEs. Based on the acquired at least one of the mobility state information, the battery level information, the load level information and the quality of service information, the processing circuit 510 (such as the determination unit, not shown) may determine a relay capability priority of each of the candidate relay UEs. After this, the processing circuit 510 (such as the determination unit, not shown) may determine the relay UE based on the relay capability priority.

Figure 6:
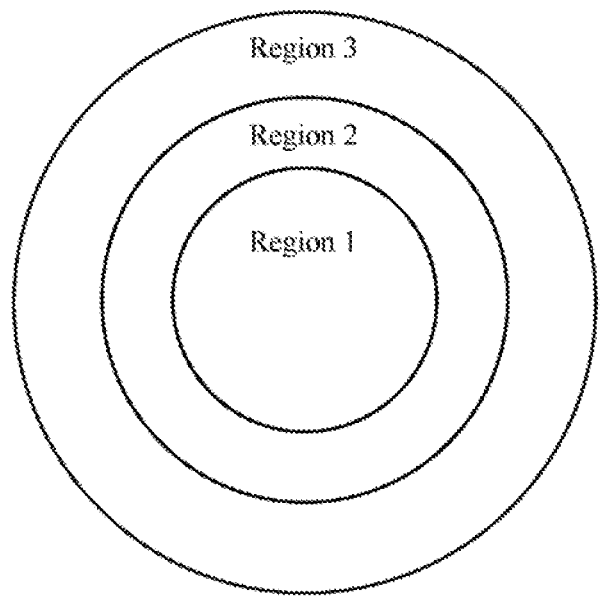
FIG. 6 is a schematic diagram showing dividing of a region where a UE is located.

For example, by monitoring SINR (alternatively, Received Signal Strength Indication (RSSI)) of a service cell, the service cell may be divided into a center region, an edge region and a middle region, as shown in FIG. 6.

The UE monitors the SINR of the service cell with a certain period, and compares a monitoring result with a preset threshold SINR_LOW and SINR_MEDIUM (SINR is a result after L1 and L3 filtering is performed).

If SINR<SINR_LOW, it is determined that the UE is located in the region 3 shown in FIG. 6;

if SINR_LOW<SINR<SINR<SINR_MEDIUM, it is determined that the UE is located in the region 2 shown in FIG. 6; and if SINR>SINR_MEDIUM, it is determined that the UE is located in the region 1 shown in FIG. 6.

It should be noted that, regions are divided based on values of the SINR rather than values of the RSRP. This is because that the UE is not located in the center region and is located approximately on a central vertical line of a connecting line of the service cell and the neighbor cell in a ease that values of RSRP of the service cell and the neighbor cell received by the UE are great, and in this case, the value of the SINR of the UE is not great. It follows that, it is more reasonable to divide the region based on the SINR.

By monitoring a change rate of the RSRP of the service cell, the UE may be classified into a high speed UE, a medium speed UE and a low speed UE (as compared with the traditional manner for classifying, the high speed UE, the medium UE, and the low speed UE based on the counted number of times of cell reselection, with the manner according to the present disclosure, a state of the UE in a current time instant can be determined more accurately; thereby facilitating selecting an appropriate temporary handover auxiliary relay.

In order to save unnecessary signaling overhead, the UE, for relaying needs to have a relatively stable state, that is, a link between the UE and the base station has a stable quality and the UE moves at a medium and low speed. Therefore, in order to determine a range of the relay UE, a variation of an RSRP of the service cell may be monitored. The variation of the RSRP of the service cell within a specific time window is indicated by $\Delta RSRP\_S$, and a sliding period of a sliding window is the same as a filtering period of a layer three filter. Generally, the $\Delta RSRP\_S$ is updated every 200 ms. The $\Delta RSRP\_S$ is compared with preset thresholds $\Delta RSRP\_LOW$ and $\Delta RSRP\_MEDIUM$, to determine a moving speed of the UE.

If $\Delta RSRP\_S<\Delta RSRP\_LOW$, it is indicated that the UE moves at a low speed;

if $\Delta RSRP\_LOW<\Delta RSRP\_S<\Delta RSRP\_MEDIUM$, it is indicated that the UE moves at a medium speed; and if $\Delta RSRP\_S>\Delta RSRP\_MEDIUM$, it is indicated that the UE moves at a high speed.

In which, $\Delta RSRP\_LOW$ and $\Delta RSRP\_MEDIUM$ may be configured dynamically based on different types of service cells of the UE, and may be transmitted to the UE by the base station as measurement configuration information.

In addition, by monitoring a change rate of the RSRP of the service cell and the neighbor cell, states of different UEs can be determined, that is, determining that which UEs are to perform a handover process, which UEs are to move from inside to outside of the coverage, and which UEs are in a public security state.

During the moving process, the UE moves at a low speed and resides in the service cell; the UE moves to the cell B from the cell A and is to perform a handover process; the UE moves from inside to outside of the coverage; or the UE is located outside the coverage instantaneously since the small cell is closed or a natural disaster damages the device. The UE in different states may complete different tasks and need to perform different operations. Therefore, according to the embodiment of the present disclosure, a case indicator may be added in the measurement report information of the UE to indicate a state of the UE. The state of the UE is reported to the base station, to facilitate controlling by the base station.

The case indicator may be indicated by two-bit binary numbers as follows;

'00' indicates that the UE resides in the service cell;

'01' indicates that the UE to perform the handover process;

'10' indicates that the UE moves from inside to outside of the coverage; and

'11' indicates that no service is provided for the UE instantaneously.

A mapping relationship between RSRPs of the UE and states of the UE is as follows ($\Delta RSRP=|\Delta RSRP\_S|+|\Delta RSRP\_N|$, where $\Delta RSRP\_S$ indicates the change rate of the RSRP of the service cell and $\Delta RSRP\_N$ indicates the change rate of the RSRP of the neighbor cell).

If ΔRSRP<Δ_th1, it is indicated that the UE moves at a low speed, substantially resides in the service cell, and the case indicator is '00';

if ΔRSRP>Δ_th2 and RSRP_N is observed, it is indicated that the UE is to perform the handover process and the case indicator is '01', where RSRP_N indicates a reception power of the neighbor cell;

if ΔRSRP>Δ_th2 and no RSRP_N is observed, it is indicated that the UE moves from inside to outside of the coverage and the case indicator is '10'; and if no RSRP_S is measured instantaneously, it is indicated that no service is provided instantaneously due to some particular reasons, and the case indicator is '11'.

By the way, according to the embodiment of the present disclosure, the processing circuit 210 (such as the control unit 211) in the electronic device 200 shown in FIG. 2 may further configure the entering condition for the relay event, such that the entering condition for the relay event is satisfied only when it is determined that the electronic device 200 is to perform the handover process (that is, the case indicator is '01').

In the technical solution according to the present disclosure, the UE may be selected to monitor the RSRP and the SINR, so as to determine a region to which the UE belongs and a moving state of the UE. As compared with solutions of base station positioning and so on, the technical solution according to the present disclosure has the following advantages.

Firstly, at present, indoor positioning does not support Global Positioning System (GPS), and only the traditional methods such as Observed Time Difference Of Arrival (OTDOA) can be used. In this case, the process is complicated, and frequent positioning may result in a signaling burden for the network; in addition, positioning accuracy is of a magnitude of ten meters to dozens of meters, which is almost equivalent to the coverage of a low power node, thereby resulting in a great error.

Secondly, the base station positioning supports only two dimensions, i.e., a longitude and a latitude, and a height cannot be positioned.

Finally, in the traditional LTE process, the RSRP and the SINR of the UE are measured and filtered. Therefore, if the state of the UE is determined based on the RSRP and the SINR, only a comparing process is added, no excessive battery level of the UE is consumed, and no extra signaling burden is generated for the network.

In addition, a state indicator may be maintained at a UE terminal side, to indicate whether the UE can function as the relay UE, and reports a result to eNodeB periodically or in response to event trigger.

In a case that the state indicator is '1', it is indicated that the UE may function as the relay UE. In a case that the state, indicator is '0', it is indicated that the UE cannot function as the relay UE.

Since the UE located in the cell center is far away from the UE located at the cell edge or even outside of the coverage and a link quality is poor, the UE located in the region 1 shown in FIG. 6 does not have the function of the relay UE. The UE terminal is not appropriate to function as the relay UE when the UE terminal moves at a high speed, has a high load level or has a low battery level. Therefore, the UE terminal determines, based on related parameters of the service cell and the neighbor cell such as RSRP and SINR, whether the UE terminal can function as the relay UE by determining its moving state, the region where the UE terminal belongs, its load level and its battery level using the determination rules mentioned above.

When and only when the UE terminal is located in the region 2 or the region 3 shown in FIG. 6, the UE moves at a low speed, has a low load level and has a medium and high battery level, the UE terminal determines that it can function as the relay UE, and the state indicator is configured as '1'; otherwise, the state indicator is configured as '0'.

When the UE terminal determines that it can function as the relay UE, the UE terminal needs to function as a repeater for long time or a permanent repeater as the traditional low power node sometimes, and needs to assist temporarily when other UE performs a handover process sometimes. Therefore, a relay type indicator may be maintained at the UE terminal, to indicate whether the UE can function as any type of repeater. In a case that the state indicator is '1', the result is reported to eNodeB periodically or in response to event trigger.

In a case that the state indicator is '1', the UE terminal may configure a value of the relay type indicator according to its intension as follows.

In a case that the relay type indicator is '1', it is indicated that the UE can function as a permanent relay UE; and in a case that the relay type indicator is '0', it is indicated that the UE can function as a temporary relay UE.

The UE terminal with the relay UE capability (that is, a UE terminal for which the state indicator is '1') may report its related information (including moobility state information, battery level information, load, level information and qualify of service information) to the eNodeB periodically or in response to event trigger. The eNodeB generates different relay UE pools based on information reported by the UE, and calculates a priority of different types of relay UEs.

Firstly, the base station may for example group relay UEs located in different regions into different relay UE pools. When the UE is to perform different operations, the UE selects different relay UE pools.

In a case that the case indicator is '01', that is, the UE is to perform a handover process, it is indicated that the UE is located in an edge region of the service cell, i.e., the region 3; and in this case, the relay UE in the region 2 may be selected to perform communication.

In a case that the case indicator is '10', that is, the UE is to move from inside to outside of the coverage, a remote UE may select a relay UE in the region 2 and the region 3 to perform communication.

Then, the base station may reasonably configure a priority of the UE with the relay capability, based on related information reported by the UE, and a Quality of Service (QoS) condition of a service being performed by the UE which is fed back by a gateway Serving GateWay (S-GW). The configuration manner is as follows:

$$Relay_{priority}=a*mobility\ state+b*battery\ level+c*load\ level+d*QoS.$$

In which, a+b+c+d=1, a, b, c and d respectively indicate the mobility state, the battery level, the load level and a contribution of QoS to the relay UE priority. Specific parameter values are obtained from actual measurement results.

In addition, mobility state, battery level, load level and QoS may be normalized variables.

Qos is taken as an example. In an access network, eNodeB is responsible for ensuring that a wireless interface bears necessary QoS. Each bear corresponds to an associated QoS Class Identifier (QCI). A less QCI indicates that the QoS has a higher requirement on service continuity and a priority for a UE to function as the relay UE is lower. Therefore, a normalization calculation equation for QoS is given as follows:

$$QoS = \frac{QCI}{9}.$$

Normalization calculation equations for other variables are similar to the above equation.

All UE terminals report respective case indicators and state indicators periodically or in response to event trigger, to indicate an operation to be performed by the UE. The reporting period may be preconfigured by the base station, and a new event for triggering may refer to that the case indicator or the state indicator changes.

The UE terminal with the relay capability (that is, the UE for which the state indicator is '1') reports it related information, including the relay type indicator, the mobility state, the region to which the UE terminal belongs, the load level and the battery level, periodically or in response to event trigger, such that the base station generates different relay UE pools and relay priorities. The reporting period may be preconfigured by the base station, and a new event for triggering may refer to that any of the reported contents changes.

If the base station agrees to a relay communication request of the UE terminal from the UE to the network, the relay may be performed in the following two manners.

In a first manner, based on a relay UE pool and a relay priority of the relay UE, the base station selects an appropriate relay UE for the UE, and transmits configuration information related to relay communication from the UE to the network to the selected relay UE and the UE terminal, in this way, a process of a relay discovery can be omitted, a time delay is small, and the manner adapts to a scene with high time delay sensitivity for the handover transition process. However, a link quality of the selected relay UE may be poor.

In a second manner, the base station transmits related information on the relay UE satisfying the condition to the UE terminal. The UE terminal measures a quality of a corresponding PC5 link, and performs communication by selecting an appropriate relay UE. In this manner, a repeater with, a good link quality can be selected, but an extra signaling overhead is generated and a time delay is great.

According, to a preferred embodiment of the present disclosure, the first measurement report mentioned above may be a measurement report for the relay event. In this case, the processing circuit 510 (such as a setting unit not shown) in the electronic device 500 shown in FIG. 5 may set scaling parameters based on a coverage of a current cell, and a coverage of a neighbor cell as a target cell. Further, the processing circuit 510 (such as a generation unit not shown) may generate measurement configuration information on the relay event including the scaling parameters to inform the UE.

The scaling parameters here, for example, may be related to parameters Hys_in, Hys_out and TTT_R mentioned above indicating the hysteresis effect of the R event.

As mentioned above, the same scaling parameter x may be used for Hys_, Hys_out and TTT_R. Here, it may be stipulated that $x \in [0, x\_th]$, where x_th indicates a maximum value of x and may be dynamically configured based on coverage radius of a source cell and a target cell for the R event.

Specifically, for example, the coverage radius of the source cell may be indicated by R_s, the coverage radius of the target cell may be indicated by R_t therefore $$x\_th = \frac{R\_s}{R\_t}.$$

Since it is difficult to acquire the coverage radius of the cell in an actual process, configuration may be performed in a simplified method as follows.

Firstly, a handover type (2 bits) dedicated for the neighbor cell is added in neighbor cell list information transmitted to the UE terminal by the base station, to indicate a handover type of a current handover. Cells may be classified into a macro cell and a low power node.

In a case that both the source cell and the target cell are macro cells or low power nodes, the handover type is configured as '00'.

In a case that the source cell is a macro cell and the target cell is a low power node, the handover type is configured as '10'.

In a case that the source cell is a low power node and the target cell is a macro cell, the handover type is configured as '10'.

After receiving the neighbor cell list related information transmitted by the base station, the UE terminal may dynamically configure a value of x.

In a case that the handover type is '00', x_th is configured as 0.5.

In a case that the handover type is '01', x_th is configured as x_th1.

In a case that the handover type is '10', x_th is configured as x_th2.

Values of x_th1 and x_th2 may be determined based on an empirical value of a ratio of coverage radius of the macro cell and the low power node in an actual network, and it is required to satisfy x_th1+x_th2=1.

According, to a preferred embodiment of the present disclosure, the processing circuit 510 (such as the determining unit not shown) in the electronic device 500 shown in FIG. 5 can determine whether the relay UE is available or not. Further, if it is determined that the relay UE is unavailable, the processing circuit 510 may not start the relay process.

In addition, according to a preferred embodiment of the present disclosure, after acquiring the first measurement report, the processing circuit 510 (such as the acquisition unit 511) may acquire a third measurement report from the UE. Based on the third measurement report, the processing circuit 510 (such as a third starting unit not shown) may start a de-relay process for causing the UE to return to directly communicate with the current cell.

It should be noted that, according to the embodiment of the present disclosure, the wireless communication system described above may be an LTE-A cellular communication system, the electronic device 500 may be a base station, and the communication unit 520, for example, may receive information transmitted by a UE of the current cell.

The base station in the wireless communication system according to the embodiment of the present disclosure is described above. Generally, after receiving the measurement report for the R event triggered by the UE terminal, the source base station can determine whether to perform relay communication from the UE to the network based on whether there is an appropriate relay UE and the state of the UE.

Firstly, the base station determines whether there is a relay UE satisfying a condition. If the base station determines that there is no relay UE satisfying the condition, the base station rejects a request from the UE terminal and maintains an original communication link. In another aspect, if the base station determines that there is a relay UE satisfying the condition, the base station starts to determine a moving state of the UE.

If the UE moves at a high speed, the base station, agrees to a relay communication request from the UE to a network. In another aspect, if the UE moves at a medium and low speed, the base station determines a handover type of the UE terminal.

If a source cell of a UE at the middle and low speed is a low power node or the base station determines that the UE traverses a target cell through an edge of the target cell, the base station agrees to the relay communication request from the UE to the network. Otherwise, the base station rejects the relay communication request of the UE terminal from the UE to the network.

Figure 7:
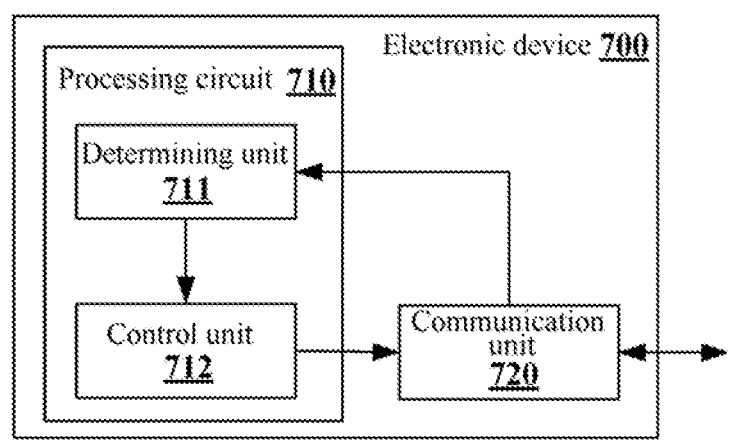
FIG. 7 is a block diagram of a structure of an electronic device in a wireless communication system according to another embodiment of the present disclosure.

Subsequently an electronic device 700 in a wireless communication system according to another embodiment of the present disclosure is described in conjunction with FIG. 7. FIG. 7 shows a structure of the electronic device 700 in a wireless communication system according to another embodiment of the present disclosure. Similarly, the wireless communication system includes multiple cells, and the multiple cells include a current cell where the electronic device 700 is located and at least one neighbor cell.

As shown in FIG. 7, the electronic device 700 may include a processing circuit 710. It should be noted that, the electronic device 700 may include one processing circuit 710 or multiple processing circuits 710. In addition, the electronic device 700 may further include a communication unit 720 such as a transceiver.

As mentioned above, similarly, the processing circuit 710 may include various separate functional units to perform different functions and/or operations. The functional units may be physical entities or logical entities, and units with different names may be implemented by the same physical entity.

For example, as shown in FIG. 7, the processing circuit 710 may include a determining unit 711 and a control unit 712.

The determining unit 711 may determine relay configuration information for a UE it a current cell.

Based on the relay configuration information determined by the determining unit 711, the control unit 712 may control the communication unit 720 to perform relay communication between the UE and the current cell before the UE hands over from the current cell to a neighbor cell.

Preferably, the processing circuit 710 (such as the determining unit) may determine an SINR of the current cell. Further, based on the SINR, the processing circuit 710 (such as the determining unit) can determine whether a region where the electronic device 700 is located is a center region, a middle region or an edge region of the current cell. Further, the processing circuit 710 (such as the control unit) may cause the communication unit 720 to transmit information on the region where the electronic device 700 is located to a base station of the current cell, such that the base station determines a candidate relay UE.

More preferably, the processing circuit 710 (such as the control unit) may cause the communication unit 720 to transmit the region information to the base station periodically. Alternatively, when the region information changes, the processing circuit 710 (such as the control unit) may cause the communication unit 720 to transmit the region information to the base station.

Preferably, the processing circuit 710 (such as the determining unit) may determine at least one of mobility state information, battery level information, load level information and quality of service information of the electronic device 700. Further, the processing circuit 710 (such as the control unit) may cause the communication unit 720 to transmit the determined at least one of the mobility state information, the battery level information, the load level information and the quality of service information to the base station of the current cell, such that the base station determines a relay capability priority of the electronic device 700.

More preferably, based on a change rate of RSRP received from time current cell by the communication unit 720, the processing circuit 710 (such as the determining unit) may determine mobility state information on the mobility speed of the electronic device 700.

More preferably, the processing circuit 710 (such as the control unit) may cause the communication unit 720 to transmit time determined at least one of the mobility state information, the battery level information, the load level information and the quality of service information periodically to the base station. Alternatively, when the determined at least one of the mobility state information, the battery level information, the load information and the quality of service information changes, the processing circuit 710 (such as the control unit) may cause the communication unit 720 to transmit the determined at least one of the mobility state information, the battery level information, the load level information and the quality of service information to the base station.

It should be noted that, according to the embodiment of the present disclosure, the wireless communication system described above may be an LTE-A cellular communication system, and the electronic device 700 may be a relay UE in the wireless communication system.

Figure 8:
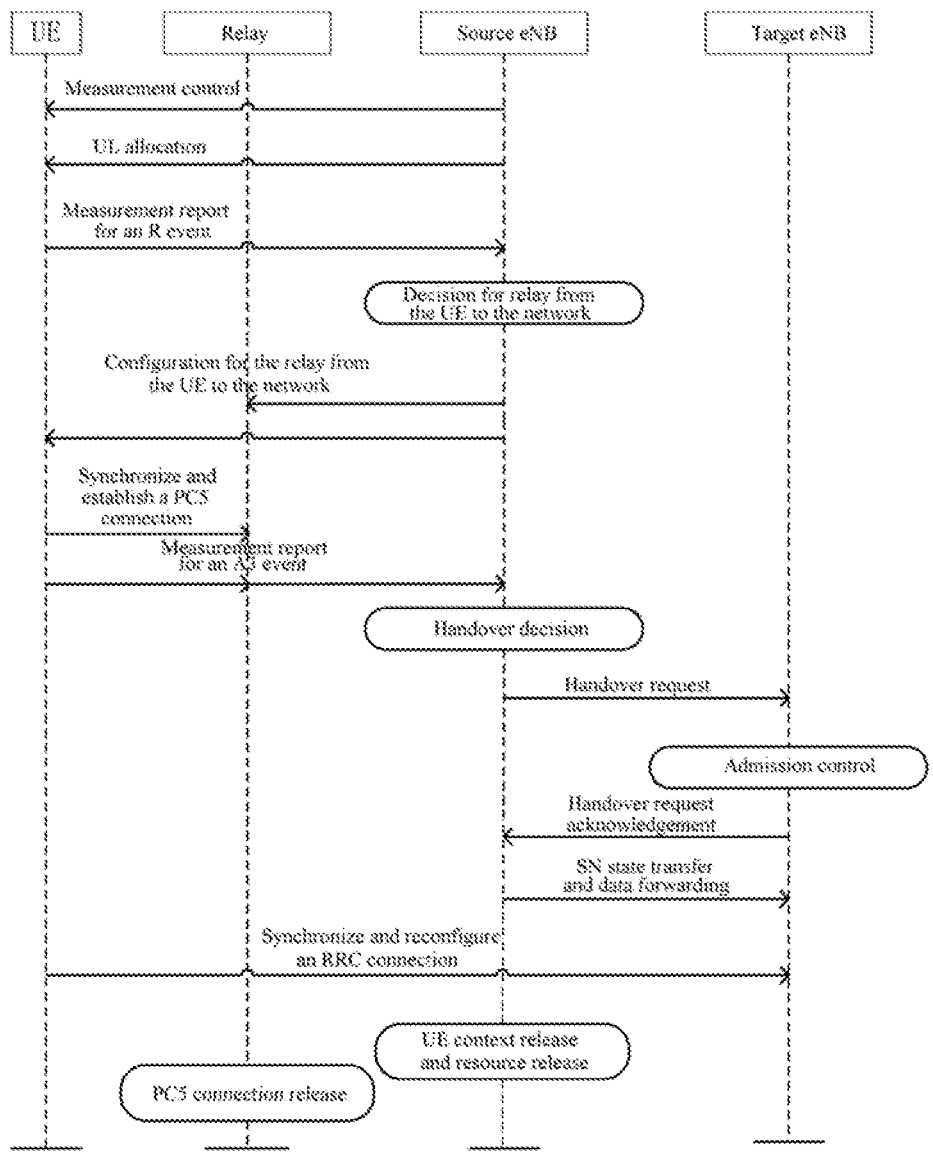
FIG. 8 is a timing diagram of a wireless communication method according to an embodiment of the present disclosure.

Subsequently, a handover signaling process according to an embodiment of the present disclosure is described in conjunction with FIG. 8. FIG. 8 shows a timing diagram of a wireless communication method according to an embodiment of the present disclosure.

As shown in FIG. 8, firstly, a source eNB transmits signaling on measurement control to a UE, and transmits signaling on UL allocation to the UE.

Subsequently, when a condition is satisfied, the UE transmits a measurement report for an R event to the source eNB.

Then, the source eNB determines a decision for relay from the UE to a network. When it is decided to perform the relay from the UE to network, the source eNB transmits configurations for the relay from the UE to network to the UE and a relay UE.

Then, the UE and the relay UE synchronize and establish a PC5 connection.

Subsequently, when a condition is satisfied, the UE transmits a measurement report on an A3 event to the source eNB.

Then, the source eNB performs a handover decision. When deciding to perform a handover, the source eNB transmits a handover request to a target eNB.

When receiving the handover request, the target eNB performs admission control. In a case of admitting a handover, the target eNB transmits a handover request acknowledgement to the source eNB.

Subsequently, the source eNB transfers an SN state and forwards data to the target eNB.

Then, the UE and the target eNB synchronize and reconfigure an RRC connection.

Then, the source eNB performs UE context release and resource release, the relay UE performs PC5 connection release, and the handover process ends.

In summary, according to the embodiment of the present disclosure, the wireless communication system including the current cell and at least one neighbor cell may be provided. The wireless communication system includes: a UE, where the UE includes a first transceiver, a first trigger circuit configured to cause the first transceiver to perform a first measurement report, to facilitate starting of a relay process for causing the UE to communicate with the current cell via a relay UE, a second trigger circuit configured to cause the first transceiver to perform a second measurement report to facilitate starting of a handover process for causing the UE to handover from the current cell to the neighbor cell, and one or more first processing circuits configured to control the first trigger circuit and the second trigger circuit, such that the transceiver performs the first measurement report prior to the second measurement report; a base station, where the base station includes one or more second processing circuits configured to perform operations of; acquiring the first measurement report, starting the relay process, acquiring the second measurement report after the first measurement report is acquired, and starting the handover process; and a relay UE, where the relay UE includes a second transceiver, and one or more third processing circuits configured to perform operations of: determining relay configuration information for the UE; and causing the second transceiver to perform relay communication between the UE and the current cell based on the relay configuration information, before the UE hands over from the current cell to the neighbor cell.

Figure 9:
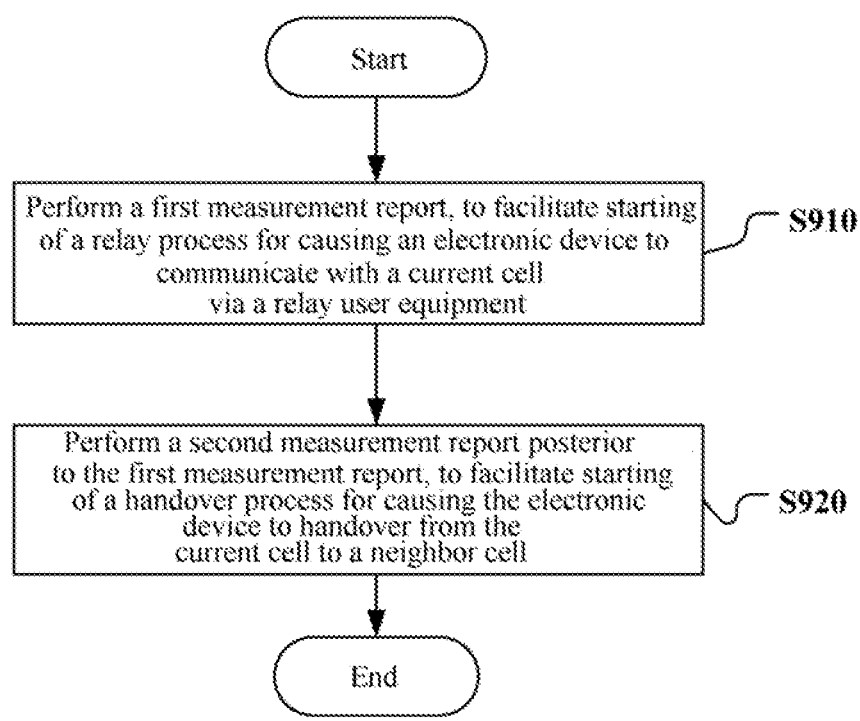
FIG. 9 is a flowchart of a wireless communication method according to an embodiment of the present disclosure.

Subsequently, a method for performing wireless communication in a wireless communication system according to an embodiment of the present disclosure is described with reference to FIG. 9. FIG. 9 shows a flowchart of a wireless communication method according to an embodiment of the present disclosure. Similarly, the wireless communication system includes multiple cells, and the multiple cells include a current cell and a neighbor cell.

As shown in FIG. 9, firstly, in step S910, the first measurement report is performed to facilitate starting of a relay process for causing the UE to communicate with a current cell via a relay UE.

Then, in step S920, a second measurement report is performed after the first measurement, to facilitate starting of a handover process for causing the UE to hand over from the current cell to a neighbor cell.

Preferably, the second measurement report may be a measurement report, for an A3 event. Specifically, when an entering condition for an A3 event is satisfied, timing may be started. When a leaving condition for an A3 event is satisfied, it is reset. When a timing result is equal to trigger time TTT_A3, the second measurement report may be performed to facilitate starting of the handover process.

Preferably, the first measurement report may be a measurement report for a relay event. Specifically, when it is determined that an entering condition for the relay event is satisfied, timing may be started. When it is determined that a leaving condition for the relay event is satisfied, it is reset. When a timing result is equal to trigger time TTT_R, the first measurement report may be performed to facilitate starting of a relay process. Here, timing for the relay event may be prior to the timing for the A3 event, and the relay event may be reset after the A3 event is reset.

Preferably, the entering condition for the relay event is satisfied, only when it is determined that the UE is to perform the handover process.

Preferably, control may be performed based on RSRPs received from the current cell and the neighbor cell.

Preferably, related parameters on a hysteresis effect of the A3 event may be scaled by using scaling parameters, to set related parameters on the hysteresis effect of the relay event, thereby performing the first measurement report prior to the second measurement report. Here, the scaling parameters may be determined based on indication information from the base station.

Preferably, it may be configured such that a hysteresis parameter in the entering condition for the relay event is x times of a hysteresis parameter in the entering condition for the A3 event, and a hysteresis parameter in the leaving condition for the relay event is 1+x times, of a hysteresis parameter in the leaving condition for the A3 event. In which, x is a real number within a range of 0 to 1.

Preferably it may be configured such that TTT_R=x*TTT_A3, where x is a real number within a range of 0 to 1.

Preferably, when it is determined that a neighbor cell which satisfies the entering condition for the relay event is the same as a neighbor cell which satisfies the entering condition for the A3 event, the TTT_A3 may be adjusted into 1−x times, where x is a real number within a range of 0 to 1.

Preferably, based on received information indicating a relay UE, control may be performed such that the UE is connected to a relay UE via proximity-based service, and the UE communicates with the current cell via the relay UE before handing over from the current service cell to the neighbor cell.

Preferably, the method may further include: performing a third measurement report to facilitate starting of a de-relay process for causing the UE to return to directly communicate with the current cell. Here, the third measurement report may be a measurement report for a de-relay event. Specifically, when it is determined that a leaving condition for a de-relay event is satisfied, timing may be started. When it is determined that a leaving condition for the de-relay event is satisfied, it is reset. When a timing result is equal to trigger time TTT_~R, the third measurement report may be performed to facilitate starting of a relay process. Here, the entering condition for the de-relay event may be the same as the leaving condition for the relay event, the leaving condition for de-relay event may be the same as the entering condition for the relay event, and it may be configured such that TTT_~R=TTT_R.

In another aspect, a method for performing wireless communication in a wireless communication system according to another embodiment of the present disclosure may include: acquiring a first measurement report from to UE of a current cell; starting a relay process for causing the UE to communicate with the current cell via a relay UE; acquiring a second measurement report from the UE after the first measurement report is acquired; and starting a handover process for causing the UE to hand over from the current cell to the neighbor cell.

Preferably, the method may further include: acquiring region information on each UE in the current cell; determining at least one candidate relay UE based on the region information; and selecting one of the candidate relay UEs as a relay UE.

Preferably, the method may further include: acquiring at least one of mobility state information, battery level information, load level information and quality of service information on each of the candidate relay UEs; determining a relay capability priority of each of the candidate relay UEs based on the acquired at least one of the mobility state information, the battery level information, the load level information and the quality of service information; and determining the relay UE based on the relay capability priority.

Preferably, the first measurement report may be a measurement report for the relay event, and the method may further include: setting scaling parameters based on a coverage of the current cell and a coverage of a neighbor cell as a target cell; and generating measurement configuration information for the relay event containing the scaling parameters to inform the UE.

Preferably, the method may further include: determining whether a relay UE is available or not, and starting no relay process if it is determined that the relay UE is unavailable.

Preferably, the method may further include; acquiring a third measurement report from the UE after the first measurement report is acquired; and starting a de-relay process for causing the UE to return to directly communicate with the current cell.

In another aspect, a method for performing wireless communication in a wireless communication system according to another embodiment of the present disclosure may include: determining relay configuration information of a UE in the current cell; and performing relay communication between the UE and the current cell based on the relay configuration information, before the UE hands over from the current cell, to the neighbor cell.

Preferably, the method may further include: determining an SINR of the current cell; determining, based on the SINR, whether a region where the UE is currently located is a center region, a middle region or an edge region of the current cell; and transmitting information on the region where the UE is currently located to a base station of the current cell, such that the base station determines a candidate relay UE.

Preferably, the region information may be transmitted to the base station periodically, or the region information may be transmitted to the base station when the region information changes.

Preferably, the method may further include: determining at least one of mobility state information, battery level information, load level information and quality of service information; and transmitting the determined at least one of the mobility state information, the battery level information, the load level information and the quality of service information to the base station of the current cell, such that the base station determines a relay capability priority.

Preferably, based on a change rate of RSRP received from the current cell, mobility state information on a mobility speed can be determined.

Preferably, the determined at least one of the mobility state information, the battery level information, the load level information and the quality of service information may be transmitted to the base station periodically, or the determined at least one of the mobility state information, the battery level information, the load level information and the quality of service information may be transmitted to the base station when the determined at least one of the mobility state information, the battery level information, the load level information and the quality of service information changes.

Specific implementations of the steps of the method for performing wireless communication in the wireless communication system according to the embodiments of the present disclosure have been described in detail above, which are not repeated here.

The technology according to the present disclosure may be applied to various types of products. For example, the base station mentioned in the present disclosure may be implemented as any type of evolution Node B (eNB), such as a macro eNB and a small eNB. The small eNB may be an eNB of a cell with a coverage less than that of a macro cell, such as a pico-eNB, micro-eNB and a household (femto) eNB. Alternatively, the base station may be implemented as any other types of base stations, such as a NodeB and a Base Transceiver Station (BTS). The base station may include: a body configured to control wireless communication (also referred to as a base station device); and one or more Remote Radio Head-ends (RRHs) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet Personal Computer (PC), a notebook PC, a portable game terminal and a portable/dongle mobile router and a digital camera) or a vehicle-mounted terminal (such as an automobile navigation device). The UE may be further implemented as a terminal performing Machine to Machine (M2M) communication (also referred to as a MTC terminal). In addition, the UE may be a wireless communication module installed on each of the above terminals (such as an integrated circuit module including a single wafer).

Figure 10:
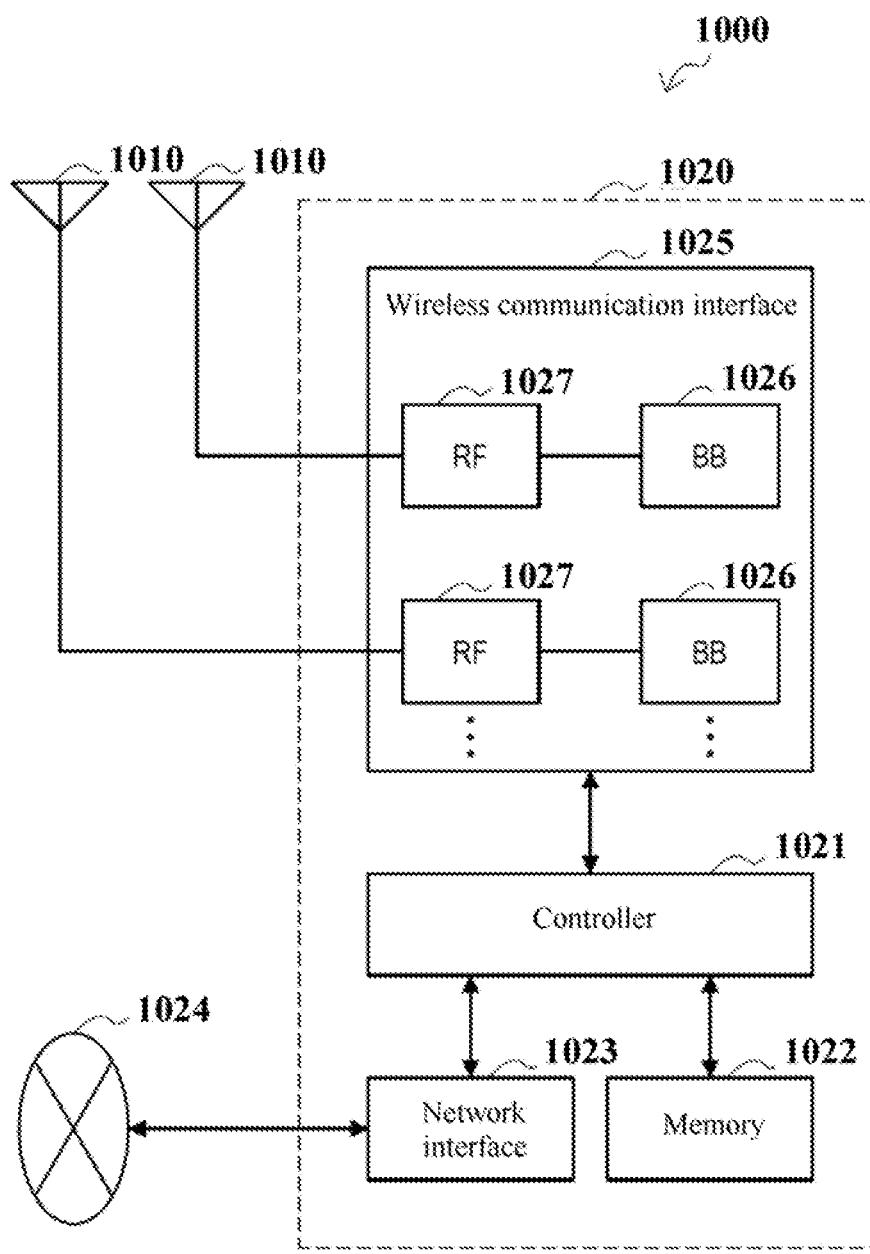
FIG. 10 is a block diagram of a first example of a schematic configuration adapting to an evolution Node Base Station (eNB) according to the present disclosure.

FIG. 10 is a block diagram showing a first example of a schematic configuration of an eNB to which the technology of the present disclosure may be applied. An eNB 1000 includes one or more antennas 1010 and a base station device 1020. The base station device 1020 and each antenna 1010 may be connected to each other via an RF cable.

Each of the antennas 1010 includes a single or multiple antenna elements (such as multiple antenna elements included in a Multiple-Input Multiple-Output (MIMO) antenna) and is used for the base station device 1020 to transmit and receive a wireless signal. As shown in FIG. 10, the eNB 1000 may include multiple antennas 1010. For example, the multiple antennas 1010 may be compatible with multiple frequency bands used by the eNB 1000. Although FIG. 10 shows an example in which the eNB 1000 includes multiple antennas 1010, the eNB 1000 may include a single antenna 1010.

The base station device 1020 includes a controller 1021, a memory 1022, a network interface 1023 and a wireless communication interface 1025.

The controller 1021 may be a CPU or DSP for example and controls various types of functions of higher layers of the base station device 1020. For example, the controller 1021 generates a data packet according to data in a signal processed by the wireless communication interface 1025, and transfers the generated, packet via the network interface 1023. The controller 1021 may bundle data from multiple baseband processors to generate a bundle packet and transfers the generated bundle packet. The controller 1021 may have logic functions to perform the following control: such as wireless resource control, wireless bearer control, mobility management, admission control and schedule. The control may be implemented in conjunction with an eNB or a core network node nearby. The memory 1022 includes an RAM and an ROM and stores programs performed by the controller 1021 and various types of control data (such as a terminal list, transmission power data and schedule data).

The network interface 1023 is a communication interface connecting a base station device 1020 to a core network 1024. The controller 1021 may communicate with a core network node or another eNB via the network interface 1023. In this case, the eNB 1000 may be connected to the core network node or other eNB via a logic interface (such as an S1 interface and an X2 interface). The network interface 1023 may also be a wired communication interface or a wireless communication interface for a wireless backhaul line. If the network interface 1023 is a wireless communication interface, the network interface 1023 may use a higher frequency hand for wireless communication as compared with a frequency band used by the wireless communication interface 1025.

The wireless communication interface 1025 supports any cellular communication scheme (such as Long Term Evolution and LTE-advanced), and provide wireless connection to a terminal in a cell of the eNB 1000 via an antenna 1010. The wireless communication interface 1025 may generally include a BaseBand (BB) processor 1026 and an RF circuit 1027. The BB processor 1026 may perform for example encoding/decoding, modulating/demodulating and multiplexing and de-multiplexing and per various types of signal, processing of layers (such as L1, Medium Access Control (MAC), Radio Link Control (RLC) and Packet Data Convergence Protocol (PDCP). Instead of a controller 1021, the BB processor 1026 may have a part or all of the logic functions described above. The BB processor 1026 may be a memory storing communication control programs, or a module including a processor configured to perform programs and related circuits. Updating programs may change functions of the BB processor 1026. The module may be a card or a blade inserted to a slot of the base station device 1020. Alternatively, the module may also be a chip installed on the card or the blade. Meanwhile, an RF circuit 1027 may include for example a mixer, as filter and an amplifier, and transmits and receives a wireless signal via the antenna 1010.

As shown in FIG. 10, the wireless communication interface 1025 may include multiple BB processors 1026. For example, the multiple BB processors 1026 may be compatible with multiple frequency bands used by the eNB 1000. As shown in FIG. 10, the wireless communication interface 1025 may include multiple RF circuits 1027. For example, the multiple RF circuits 1027 may be compatible with multiple antenna elements. Although FIG. 10 shows an example in which the wireless communication interface 1025 includes multiple BB processors 1026 and multiple RF circuits 1027, the wireless communication interface 1025 may include a single BB processor 1026 or a single RF circuit 1027.

Figure 11:
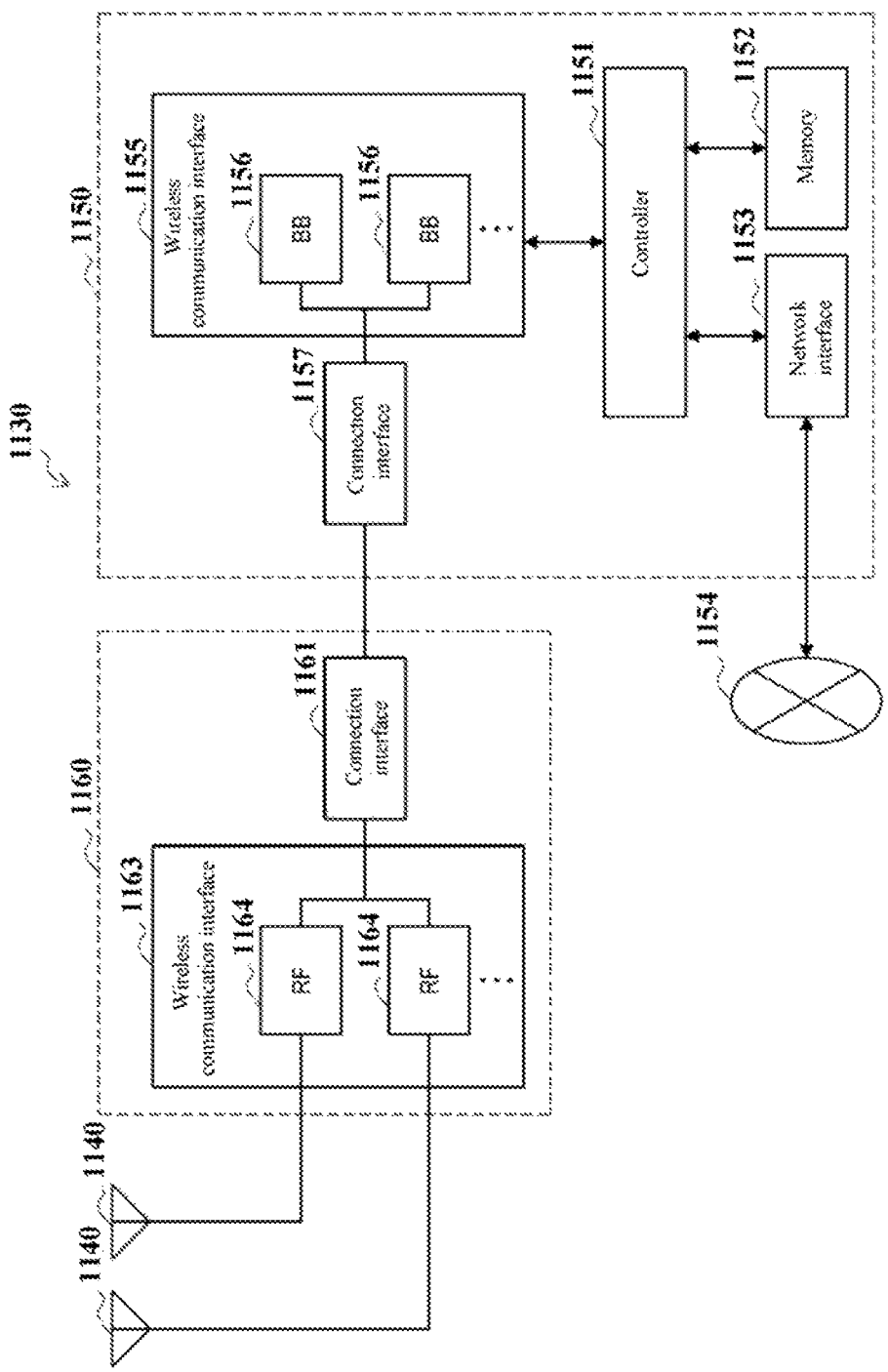
FIG. 11 is a block diagram of a second example of the schematic configuration adapting to the eNB according to the present disclosure.

FIG. 11 is a block diagram showing a second example of the schematic configuration of the eNB to which the technology of the present disclosure may be applied. An eNB 1130 includes one or more antennas 1140, a base station device 1150 and an RRH 1160. The RRH 1160 and each antenna 1140 may be connected to each other via an RF cable. The base station device 1150 and the RRH 1160 may be connected to each other via a high speed line such as an optical fiber cable.

Each of the antennas 1140 includes a single or multiple antenna elements (such as multiple antenna elements included in the MIMO antenna) and is used for the RRH 1160 to transmit and receive a wireless signal. As shown in FIG. 11, the eNB 1130 may include multiple antennas 1140. For example, the multiple antennas 1140 may be compatible with multiple frequency bands used by the eNB 1130. Although FIG. 11 shows an example in which the eNB 1130 includes multiple antennas 1140, the eNB 1130 may include a single antenna 1140.

The base station, device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 described with reference to FIG. 10.

A wireless communication interface 1155 supports any cellular communication scheme (such as LTE and LTE-advanced), and provide wireless communication with a terminal in a sector corresponding to the RRH 1160 via the RRH 1160 and the antenna 1140. The wireless communication interface 1155 may generally include a BB processor 1156 for example. In addition to that the BB processor 1156 is connected to an RF circuit 1164 of the RRH 1160 via the connection interface 1157, the BB processor 1156 is the same as the BB processor 1026 described with reference to FIG. 10. As shown in FIG. 11, the wireless communication interface 1155 may include multiple BB processors 1156. For example, the multiple BB processors 1156 may be compatible with multiple frequency bands used by the eNB 1130. Although FIG. 11 shows an example in which the wireless communication interface 1155 includes multiple BB processors 1156, the wireless communication interface 1155 may include a single BB processor 1156.

The connection interface 1157 is an interface configured to connect the base station device 1150 (the wireless communication interface 1155) to the RRH 1160. The connection interface 1157 may be a communication module for communication in the high speed line described above which connects the base station device 1150 (the wireless communication interface 1155) to the RRH 1160.

The RRH 1160 includes a connection interface 1161 and a wireless communication interface 1163.

The connection interface 1161 is an interface configured to connect the RRH 1160 (the wireless communication interface 1163) to the base station device 1150. The connection interface 1161 may be a communication module for performing communication via the high speed line described above.

The wireless communication interface 1163 transmits and receives a wireless signal via the antenna 1140. The wireless communication interface 1163 may generally include an RF circuit 1164 for example. The RF circuit 1164 may include for example a mixer, a filter and an amplifier, and transmits and receives a wireless signal via the antenna 1140. As shown in FIG. 11, the wireless communication interface 1163 may include multiple RF circuits 1164. For example, the multiple RF circuits 1164 may support multiple antenna elements. Although FIG. 11 shows an example in which the wireless communication interface 1163 includes multiple RF circuits 1164, the wireless communication interface 1163 may include a single RF circuit 1164.

In the eNB 1000 and the eNB 1130 shown in FIG. 10 and FIG. 11, the processing circuit 510 described with reference to FIG. 5 and the acquisition unit 511 and the starting units 512 and 513 in the processing circuit 510 may be implemented by the controller 1021 and/or the controller 1151, and the communication unit 520 described with reference to FIG. 5 may be implemented by the wireless communication interface 1025 and the wireless communication interface 1155 and/or the wireless communication interface 1163. At least a part of the functions may be implemented by the controller 1021 and the controller 1151. For example, the controller 1021 and/or the controller 1151 may perform the information acquisition function, the relay process starting function and the handover process starting function by executing instructions stored in the corresponding memory.

Figure 12:
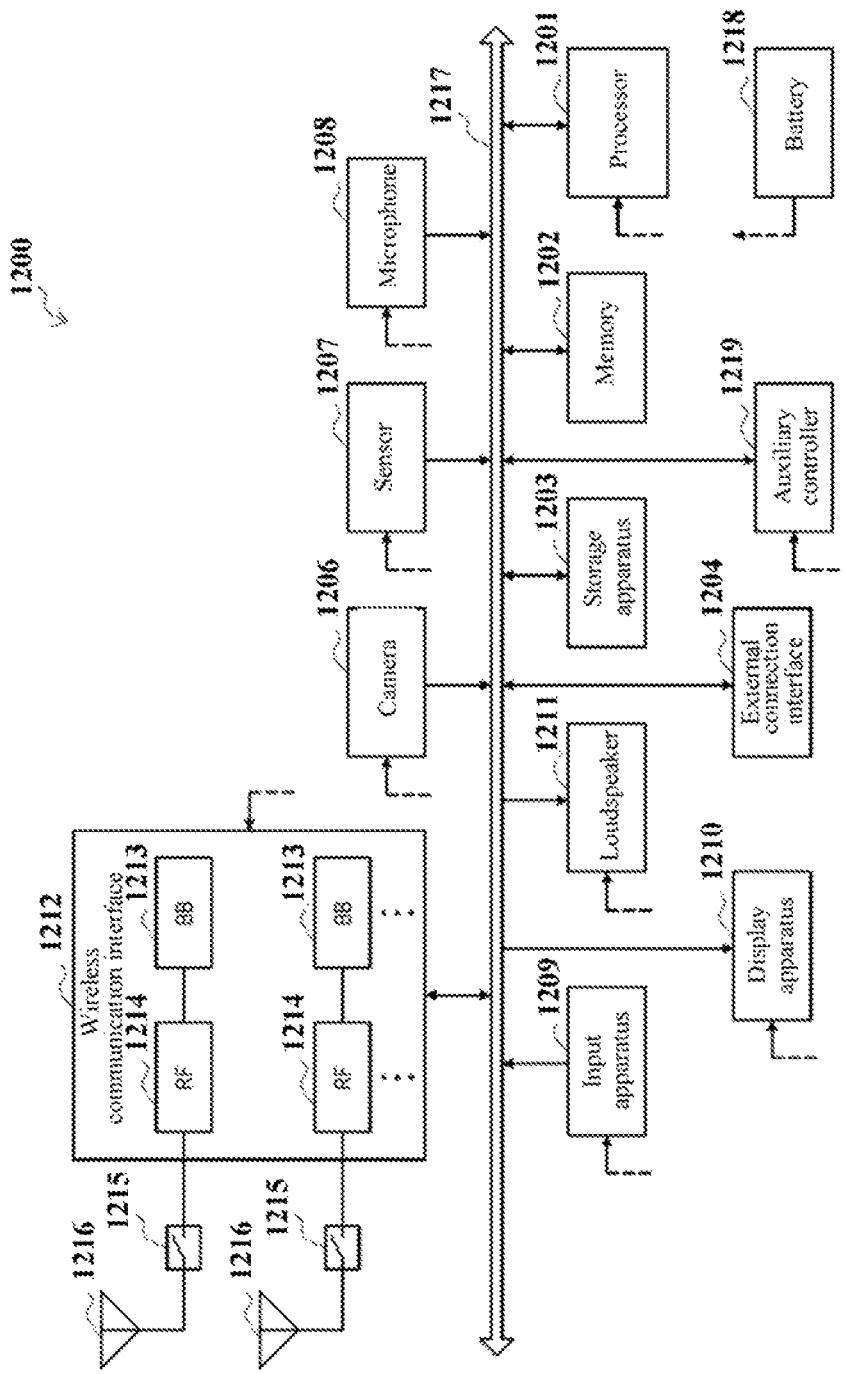
FIG. 12 is a block diagram of an example of a schematic configuration adapting to a smart phone according to the present disclosure.

FIG. 12 is a block diagram showing an example of a schematic configuration of a smart phone 1200 to which the technology of the present disclosure may be applied. The smart phone 1200 includes: a processor 1201, a memory 1202, a storage apparatus 1203, an external connection interface 1204, a camera 1206, a sensor 1207, a microphone 1208, an input apparatus 1209, a display apparatus 1210, a loudspeaker 1211, a wireless communication interface 1212, one or more antenna switches 1215, one or more antennas 1216, a bus 1217, a battery 1218 and an auxiliary controller 1219.

The processor 1201 may be for example a CPU or a System on Chip (SoC), and control functions of an application layer and other layers of the smart phone 1200. The memory 1202 includes an RAM and an ROM, and stores programs executed by the processor 1201 and data. The storage apparatus 1203 may include a storage medium, such as a semiconductor memory and a hard disk. The external connection interface 1204 is an interface configured to connect an external apparatus (such as a memory card and a Universal Serial Bus (USB) device) to the smart phone 1200.

The camera 1206 (i includes an image sensor (such as a Charge Coupled Device (CCD) and a Complementary Metal Oxide Semiconductor (CMOS)) and generates a captured image. The sensor 1207 may include a set of sensors, such as a measurement sensor, a gyroscope sensor, a geomagnetic sensor and an acceleration sensor. The microphone 1208 converts sound inputted into the smart phone 1200 into an audio signal. The input apparatus 1209 includes for example a touch sensor configured to detect touch on a screen of the display apparatus 1210, a keypad, a keyboard, a button or a switch, and receives an operation or information inputted from a user. The display apparatus 1210 includes a screen (such as a Liquid Crystal Display (LCD) and an Organic Light Emitting Diode (OLED) display), and displays an output image of the smart phone 1200. The loudspeaker 1211 converts the audio signal outputted from the smart phone 1200 into sound.

The wireless communication interface 1212 supports any cellular communication scheme (such as LTE and LTE-advanced), and performs wireless communication. The wireless communication interface 1212 may generally include for example a BB processor 1213 and an RF circuit 1214. The BB processor 1213 may perform encoding/decoding modulating/demodulating and multiplexing/de-multiplexing, for example, and perform various types of signal processing for wireless communication. Meanwhile, the RF circuit 1214 may include for example a mixer, a filter and an amplifier, and transmits and receives a wireless signal via an antenna 1216. The wireless communication interface 1212 may be a chip module on which a BB processor 1213 and the RF circuit 1214 are integrated. As shown in FIG. 12, the wireless communication interface 1212 may include multiple BB processors 1213 and multiple RF circuits 1214. Although FIG. 12 shows an example in which the wireless communication interface 1212 includes multiple BB processors 1213 and multiple RF circuits 1214, the wireless communication interface 1212 may include a single BB processor 1213 or a single RF circuit 1214.

In addition to the cellular communication scheme, the wireless communication interface 1212 may support other types of wireless communication schemes, such as a short distance wireless communication scheme, a near field communication scheme and a wireless Local Area Network (LAN) scheme. In this case, the wireless communication interface 1212 may include a BB processor 1213 and an RF circuit 1214 for each type of wireless communication scheme.

Each of the wireless switches 1215 switches a connection destination of the antenna 1216 between multiple circuits (for example circuits for different wireless communication schemes) included in the wireless communication interface 1212.

Each of the antennas 1216 includes a single or multiple antenna elements (such as multiple antenna elements included in the MIMO antenna), and is used for the wireless communication interface 1212 to transmit and receive a wireless signal. As shown in FIG. 12, the smart phone 1200 may include multiple antennas 1216. Although FIG. 12 shows an example in which the smart phone 1200 includes multiple antennas 1216, the smart phone 1200 may include a single antenna 1216.

In addition, the smart phone 1200 may include an antenna 1216 for each type of wireless communication scheme. In this case, the antenna switch 1215 may be omitted from the configuration of the smart phone 1200.

The bus 1217 connects the processor 1201, the memory 1202, the storage apparatus 1203, the external connection interface 1294, the camera 1206, the sensor 1207, the microphone 1208, the input apparatus 1209, the display apparatus 1210, the loudspeaker 1211, the wireless communication interface 1212 and the auxiliary controller 1219 with each other. The battery 1218 supplies power for blocks in the smart phone 1200 shown in FIG. 12 via a feeder which is indicated partially as a dashed line in the figure. The auxiliary controller 1219 controls a minimum necessary function of the smart phone 1200 in a sleeping mode, for example.

In the smart phone 1200 shown in FIG. 12, the processing circuit 210 described with reference to FIG. 2 and the control unit 211 and the trigger circuits 221 and 222 included in the processing circuit 210, and the processing circuit 710 described with reference to FIG. 7 and the determining unit 711 and the control unit 712 included in the processing circuit 710, may be implemented by the processor 1201 or the auxiliary controller 1219. In addition, the communication unit 230 described with reference to FIG. 2 and the communication unit 720 described with reference to FIG. 7 may be implemented by the wireless communication interface 1212. At least a part of the functions may be implemented by the processor 1201 or the auxiliary controller 1219. For example, the processor 1201 or the auxiliary controller 1219 may perform the measurement report functions and the relay communication function by executing instructions stored in the memory 1202 or the storage apparatus 1203.

Figure 13:
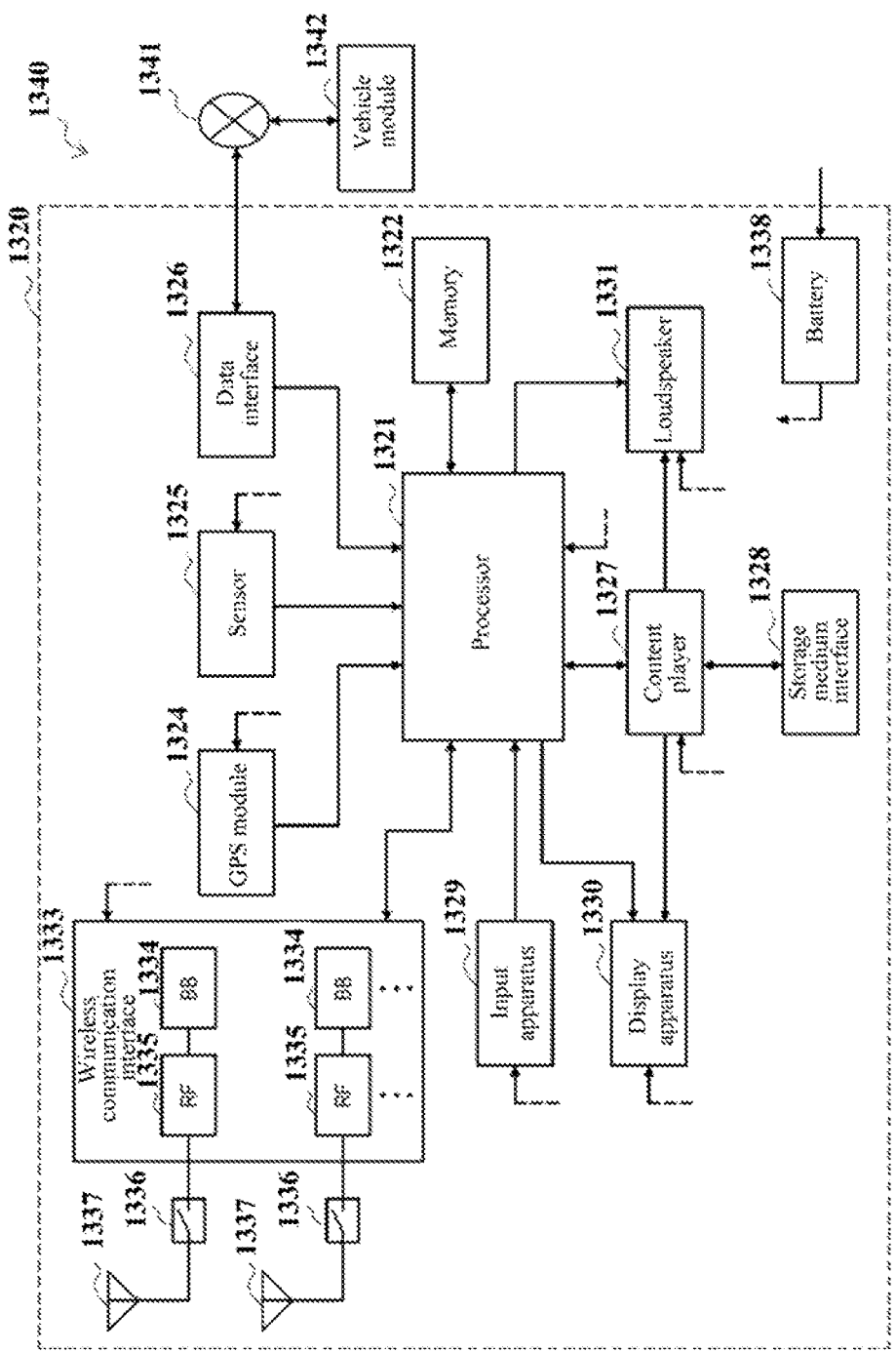
FIG. 13 is a block diagram of an example of a schematic configuration adapting to an automobile navigation device according to the present disclosure.

FIG. 13 is a block diagram showing an example of a schematic configuration of an automobile navigation device 1320 to which the technology of the present disclosure may be applied. The automobile navigation device 1320 includes a processor 1321, a memory 1322, a Global Positioning System (GPS) module 1324, a sensor 1325, a data interface 1326, a content player 1327, a storage medium interface 1328, an input apparatus 1329, a display apparatus 1330, a loudspeaker 1331, a wireless communication interface 1333, one or more antenna switches 1336, one or more antennas 1337 and a battery 1338.

The processor 1321 may be a CPU or an SoC, and controls a navigation function and other functions of the automobile navigation device 1320. The memory 1322 includes an RAM and an ROM, and stores programs executed by the processor 1321 and data.

The GPS module 1324 measures a position of the automobile navigation device 1320 (such as a latitude, a longitude and a height) by using a GPS signal received from a GPS satellite. The sensor 1325 may include a set of sensors, such as a gyroscope sensor, a geomagnetic sensor and an air pressure sensor. The data interface 1326 is connected to a vehicle network 1341 for example through a terminal not shown, and acquires data generated by the vehicle (such as vehicle speed data).

The content player 1327 reproduces contents stored in a storage medium (such as a CD and a DVD), and the storage medium is inserted into the storage medium interface 1328. The input apparatus 1329 includes for example a touch sensor configured to detect touch on a screen of the display apparatus 1330, a button or a switch, and receives an operation or information inputted from a user. The display apparatus 1330 includes a screen of an LCD or OLED display for example, and displays an image with a navigation function or the reproduced content. The loudspeaker 1331 outputs a sound with a navigation function or the reproduced content.

The wireless communication interface 1333 supports any cellular communication scheme (such as LTE and LTE-advanced), and performs wireless communication. The wireless communication interface 1333 may generally include a BB processor 1334 and an RF circuit 1335 for example. The BB processor 1334 may perform encoding/decoding, modulating/demodulating and multiplexing/de-multiplexing, and perform various types of signal processing for wireless communication. Meanwhile, the RF circuit 1335 may include for example a mixer, a filter and an amplifier, and transmits and receives a wireless signal via the antenna 1337. The wireless communication interface 1333 may also be a chip module on which the BB processor 1334 and the RF circuit 1335 are integrated. As shown in FIG. 13, the wireless communication interface 1333 may include multiple BB processors 1334 and multiple RF circuits 1335. Although FIG. 13 shows an example in which the wireless communication interface 1333 includes multiple BB processors 1334 and multiple RF circuits 1335, the wireless communication interface 1333 may include a single BB processor 1334 or a single RF circuit 1335.

In addition to the cellular communication scheme, the wireless communication interface 1333 may support other types of wireless communication schemes, such as a short distance wireless communication scheme, a near field communication scheme and a wireless LAN scheme. In this case, for each type of wireless communication scheme, the wireless communication interface 1333 may include the BB processor 1334 and the RF circuit 1335.

Each of the antenna switches 1336 switches a connection destination of the antenna 1337 between multiple circuits (such as circuits for different wireless communication schemes) included in the wireless communication interface 1333.

Each of the antennas 1337 includes a single or multiple antenna elements (such as multiple antenna elements included in the MIMO antenna), and is used for the wireless communication interface 1333 to transmit and receive a wireless signal. As shown in FIG. 13, the automobile navigation device 1320 may include multiple antennas 1337. Although FIG. 13 shows an example in which the automobile navigation device 1320 includes multiple antennas 1337, the automobile navigation device 1320 may include a single antenna 1317.

In addition, the automobile navigation device 1320 may include the antenna 1337 for each type of wireless communication scheme. In this case, the antenna switch 1336 may be omitted from the configuration of the automobile navigation device 1320.

The battery 1338 supplies power for blocks in the automobile navigation device 1320 shown in FIG. 13 via a feeder which is indicated partially as a dashed line in the figure. The battery 1338 accumulates power provided by the vehicle.

In the automobile navigation device 1320 shown in FIG. 13, the processing circuit 210 described with reference to FIG. 2 and the control unit 211 and the trigger circuits 221 and 222 included in the processing circuit 210, and the processing circuit 710 described with reference to FIG. 7 and the determining unit 711 and the control unit 712 included in the processing circuit 710, may be implemented by the processor 1321. In addition, the communication unit 230 described with reference to FIG. 2 and the communication unit 720 described with reference to FIG. 7 may be implemented by the wireless communication interface 1333. At least a part of the functions may be implemented by the processor 1321. For example, the processor 1321 may perform the measurement report function and the relay communication function by executing instructions stored in the memory 1322.

The technology of the present disclosure may be implemented as a vehicle-mounted system for a vehicle) 1340 including one or more of the automobile navigation device 1320, the vehicle network 1341 and a vehicle module 1342. The vehicle module 1342 generates vehicle data (such as a vehicle speed, an engine speed and fault information), and outputs the generated data to the vehicle network 1341.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof.

The invention claimed is:

1. An electronic device in a wireless communication system, wherein the wireless communication system comprises a plurality of cells comprising a current cell in which the electronic device is located and at least one neighbor cell, and the electronic device comprises:

a transceiver; and
one or more processing circuits configured to:
  determine if a relay entering condition is satisfied based on a measurement result of the current cell and a measurement result of the neighbor cell;
  start a relay process for causing the electronic device to communicate with the current cell via a relay user equipment if the relay entering condition is determined to be satisfied;
  determine if a handover entering condition is satisfied based on the measurement result of the current cell and the measurement result of the neighbor cell; and
  start a handover process for causing the electronic device to hand over from the current cell to the neighbor cell if the handover entering condition is determined to be satisfied,
wherein the relay entering condition and the handover entering condition are configured so that the relay process is started prior to the handover process.

2. The electronic device according to claim 1, the electronic device further comprising:
a first trigger circuit configured to cause the transceiver to perform a first measurement report when the relay entering condition is determined to be satisfied;
a second truer circuit configured to cause the transceiver to perform a second measurement report when the handover entering condition is determined to be satisfied,
wherein the second measurement report is a measurement report for an A3 event, and
wherein the processing circuit is further configured to start timing for the second trigger circuit when it is determined that the handover entering condition is satisfied and to rest the timing for the second trigger circuit when it is determined that a handover leaving condition is satisfied, and
wherein the transceiver is caused to perform the second measurement report when a result of the timing of the second trigger circuit reaches a first trigger time.

3. The electronic device according to claim 2, wherein the first measurement report is a measurement report for a relay event,
wherein the processing circuit is further configured to start timing for the first trigger circuit when it is determined that the relay entering condition is satisfied and to reset the timing for the first trigger circuit when it is determined that a relay leaving condition is satisfied, and
wherein the transceiver is caused to perform the first measurement report when a result of the timing of the first trigger circuit reaches a second trigger,
wherein the processing circuit configures the relay entering condition such that the first trigger circuit starts timing prior to the second trigger circuit, and
wherein the processing circuit configures the relay leaving condition such that the first trigger circuit is reset posterior to the second trigger circuit.

4. The electronic device according to claim 3, wherein the measurement results of the current cell and the neighbor cell are based on a Reference Signal Receiving Power (RSRP) received by the transceiver from the current cell and the neighbor cell.

5. The electronic device according to claim 3, wherein the processing circuit is further configured to:
scale related parameters influencing a hysteresis effect of the A3 event with a scaling parameter to set related parameters for a hysteresis effect of the relay event in a manner such that the transceiver is caused to perform the first measurement report prior to the second measurement report; and
determine the scaling parameter based on indication information from a base station.

6. The electronic device according to claim 3, wherein the processing circuit is further configured to:
set a hysteresis parameter in the relay entering condition as x times of a hysteresis parameter in the handover entering condition for the A3 event; and
set a hysteresis parameter in the relay leaving condition as 1+x times of a hysteresis parameter in the handover leaving condition for the A3 event,
where x is a real number within a range of 0 to 1.

7. The electronic device according to claim 3, wherein the processing circuit s further configured to set the second trigger time to be x times the first trigger time,
Where x is a real number within a range of 0 to 1.

8. The electronic device according to claim 3, wherein the processing circuit is further configured to adjust the first trigger time to be 1-x times, where x is a real number within a range of 0 to 1, when it is determined that the neighbor cell that satisfies the relay entering condition is same as the neighbor cell that satisfies the handover entering condition for the A3 event.

9. The electronic device according to claim 1, wherein the processing circuit is further configured to:
control the first and second trigger circuits based on information indicating the relay user equipment received by the transceiver so as to communicate with the current cell via the relay user equipment before handing over from the current cell to the neighbor cell; and
connect the electronic device to the relay user equipment via proximity-based service.

10. The electronic device according to claim 3, further comprising:
a third trigger circuit configured to cause the transceiver to perform a third measurement report to facilitate starting of a de-relay process for causing the electronic device to return to directly communication with the current cell,
wherein the third measurement report is a measurement report for a de-relay event,
wherein the processing circuit is further configured to:
start timing for the third trigger circuit when it is determined that an entering condition for the de-relay event is satisfied;
reset the timing for the third trigger circuit when it is determined that a leaving condition for the de-relay event is satisfied;
cause the transceiver to perform the third measurement report to facilitate starting of the de-relay process when a result of the timing of the third trigger circuit reaches a third trigger time;
configure the entering condition for the de-relay event to be the same as the relay leaving condition;
configure the leaving condition for the de-relay event is to be the same as the relay entering condition; and
configure the third trigger time to be equal to the second trigger time.

11. An electronic device in a wireless communication system, wherein the wireless communication system comprises a plurality of cells comprising a current cell in which the electronic device is located and at least one neighbor cell, and the electronic equipment comprises:

one or more processing circuits configured to:
acquire a first measurement report from a user equipment of the current cell;
start a relay process for causing the user equipment to communicate with the current cell via a relay user equipment in response to the first measurement report;
acquire, after the first measurement report is acquired, a second measurement report from the user equipment; and
start a handover process for causing the user equipment to hand over from the current cell to the neighbor cell in response to the second measurement report,
wherein the relay process is started prior to the handover process, and
wherein the first and second measurement reports include a measurement by the user equipment of the current cell and a measurement by the user equipment of the neighbor cell.

12. The electronic device according to claim 11, wherein the processing circuit is further configured to:
acquire region information of each user equipment in the current cell;
determine at least one candidate relay user equipment based on the region information; and
select one of the at least one candidate relay user equipment as the relay user equipment.

13. The electronic device according to claim 12, wherein the processing circuit is further configured to perform operations of:
acquire at least one of mobility state information, battery level information, load level information and Quality of Service (QoS) information on each of the candidate relay user equipments;
determined, based on the acquired at least one of the mobility state information, the battery level information, the load level information and the QoS information, a relay capability priority of each of the candidate relay user equipments; and
determine the relay user equipment based on the relay capability priority.

14. The electronic device according to claim 11, wherein the first measurement report is a measurement report for a relay event, and
wherein the processing circuit is further configured to:
set a scaling parameter based on a coverage of the current cell and a coverage of the neighbor cell as a target cell; and
generate measurement configuration information on the relay event containing the scaling parameter to inform the user equipment.

15. The electronic device according to claim 11, wherein the processing circuit is further configured to:
determine whether the relay user equipment is available or not; and
cease to start the relay process in response to the determination that the relay user equipment is unavailable.

16. The electronic device according to claim 11, wherein the processing circuit is further configured to perform operations of:
acquiring, after the first measurement report is acquired, a third measurement report from the user equipment; and
starting a de-relay process for causing the user equipment to return to directly communication with the current cell.

17. The electronic device according to claim 11, wherein the electronic device is a base station, and further comprises a transceiver configured to receive information transmitted by the user equipment of the current cell.

18. The electronic device according to claim 1, wherein the processing circuit is further configured to:
determine relay configuration information on the relay user equipment in the current cell; and
cause, based on the relay configuration information, the transceiver to perform relay communication between the user equipment and the current cell before the user equipment hands over from the current cell to the neighbor cell.

19. The electronic device according to claim 18, wherein the processing circuit is further configured to:
determine a Signal to Interference plus Noise Ratio (SINR) of the current cell;
determine, based on the SINR, whether a region where the electronic device is located is a center region, a middle region, or an edge region of the current cell; and
cause the transceiver to transmit region information on the region where the electronic device is located to a base station of the current cell, such that the base station determines a candidate relay user equipment.

20. The electronic device according to claim 18, wherein the processing circuit is further configured to:
determine at least one of mobility state information, battery level information, load level information and Quality of Service (QoS) information of the electronic device; and
cause the transceiver to transmit the determined at least one of the mobility state information, the battery level information, the load level information and the QoS information to base station of the current cell, such that the base station determines a relay capability priority of the electronic device.

* * * * *